(12) United States Patent
Gupta

(10) Patent No.: US 9,459,009 B2
(45) Date of Patent: Oct. 4, 2016

(54) FUEL EFFICIENT ULTRA-LOW EMISSION AND IMPROVED PATTERN FACTOR COLORLESS DISTRIBUTED COMBUSTION FOR STATIONARY AND PROPULSION GAS TURBINE APPLICATIONS

(71) Applicant: University of Maryland, College Park, MD (US)

(72) Inventor: Ashwani K Gupta, College Park, MD (US)

(73) Assignee: UNIVERSITY OF MARYLAND, College Park, MD (US)

( * ) Notice: Subject to any disclaimer, the term of this patent is extended or adjusted under 35 U.S.C. 154(b) by 379 days.

(21) Appl. No.: 14/223,378

(22) Filed: Mar. 24, 2014

(65) Prior Publication Data
US 2014/0202162 A1    Jul. 24, 2014

Related U.S. Application Data

(62) Division of application No. 12/686,742, filed on Jan. 13, 2010, now Pat. No. 8,695,350.

(60) Provisional application No. 61/144,295, filed on Jan. 13, 2009.

(51) Int. Cl.
*F23R 3/20* (2006.01)
*F23R 3/18* (2006.01)
(Continued)

(52) U.S. Cl.
CPC . *F23R 3/20* (2013.01); *F02C 7/22* (2013.01); *F23C 9/006* (2013.01); *F23C 2900/99001* (2013.01); *Y02E 20/342* (2013.01); *Y02T 50/671* (2013.01)

(58) Field of Classification Search
CPC ............ F23R 3/20; F23R 3/18; F23R 3/002; F23R 3/06; F23R 3/10; F23R 3/12; F23R 3/46; F23R 2900/03342; F23R 2900/00015; F23C 9/006; F23C 2900/99001; Y02E 20/342
See application file for complete search history.

(56) References Cited

U.S. PATENT DOCUMENTS 6,796,789 B1 *  9/2004  Gibson ................. F23C 3/00
                                                             431/11
8,695,350 B2    4/2014  Gupta
(Continued)

OTHER PUBLICATIONS

Arghode et al., "Colorless Distributed Combustion (CDC): Effect of Flowfield Configuration", Univ. of MD, Dept. of Mech. Eng., Amer. Inst. of Aeronautics and Astronautics.
(Continued)

*Primary Examiner* — Andrew Nguyen
(74) *Attorney, Agent, or Firm* — Carter, DeLuca, Farrell & Schmidt, LLP

(57) ABSTRACT

Colorless distributed combustion (CDC) reactors or green combustion gas turbine combustors having a combustion chamber are presented for improved performance of gas turbine combustion engines. The combustors are configured and designed for providing a superior pattern factor (uniform thermal field in the combustion zone) and a reduction or complete elimination of pollutants emission from the combustor (i.e., zero emission gas turbine combustor) and uniform thermal field in the entire combustion zone to provide significantly improved pattern factor. Colorless distributed combustion is achieved with fuel and air entering the combustion chamber via one or more injection ports as non-premixed, or premixed. Rectangular, cylindrical, stadium and elliptical shaped combustors are presented with injection ports and exit ports located in various locations of the combustors. The mixture preparation between fuel and air with the hot combustion products is carried out either with the gases present in the combustion chamber or via a communication link between the exit gases from the combustor back to the combustion chamber.

6 Claims, 43 Drawing Sheets

(51) Int. Cl.
   *F23C 9/00*   (2006.01)
   *F02C 7/22*   (2006.01)

(56) References Cited

U.S. PATENT DOCUMENTS

2002/0069648 A1* 6/2002 Levy .................. F23C 9/006
                                                    60/804
2005/0282097 A1  12/2005 Carrea et al.

OTHER PUBLICATIONS

Arghode et al., "Colorless Distributed Combustion (CDC) for Gas Turbine Application", Univ. of MD, Dept. Mechanical Eng., Enter Classification.

Arghode et al., "Effect of Confinement on Colorless Distributed Combustion for Gas Turbine Engines", Univ. of MD, Dept. of Mech. Eng.

Arghode et al., "Effect of flow field for colorless distributed combustion (CDC) for gas turbine combustion", Univ. of MD, Dept. of Mechanical Eng., Applied Energy (2009).

Arghode et al., "Investigation of Fuel/Air Mixing Characteristics in a CDC Combustor", Univ. of MD, Dept. of Mechanical Eng., Proc. 19th Intnl. Symp. on Air Breathing Engines (ISABE), Canada (Sep. 2009).

Arghode et al., "Investigation of Non-Premixed and Premixed Distributed Combustion for GT Application", Univ. of MD, Dept. of Mechanical Eng.

Arghode et al., "Numerical Simulations of Gas Recirculation for CDC Combustor", Univ. of MD, Dept. of Mechanical Eng., 7th High Temp. Air Comb. and Gas. Intnl. Symposium, Thailand (Jan. 2008).

* cited by examiner

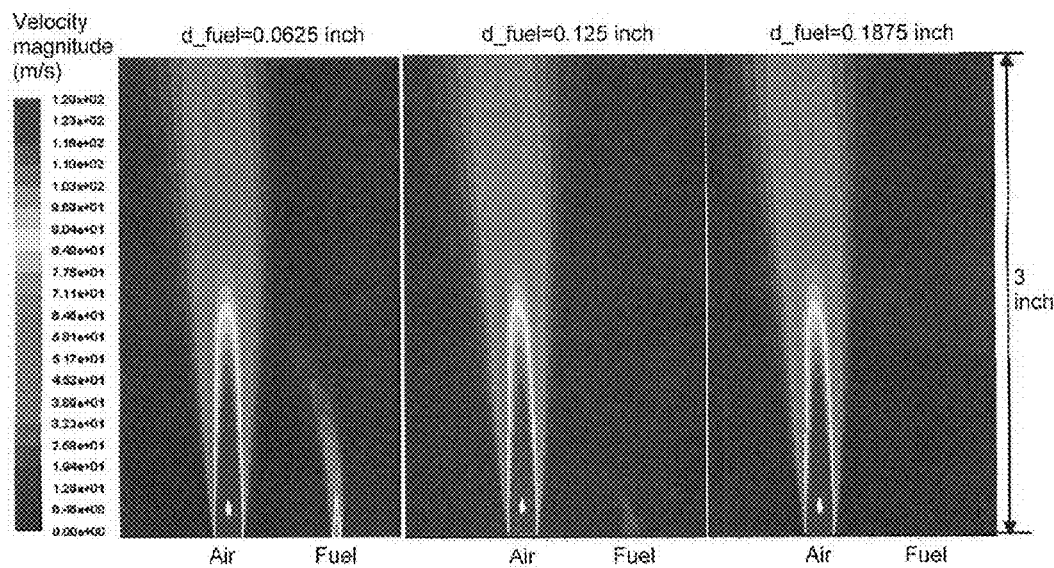
(a) Effect of fuel injection diameter (d_air =0.1875 inch)
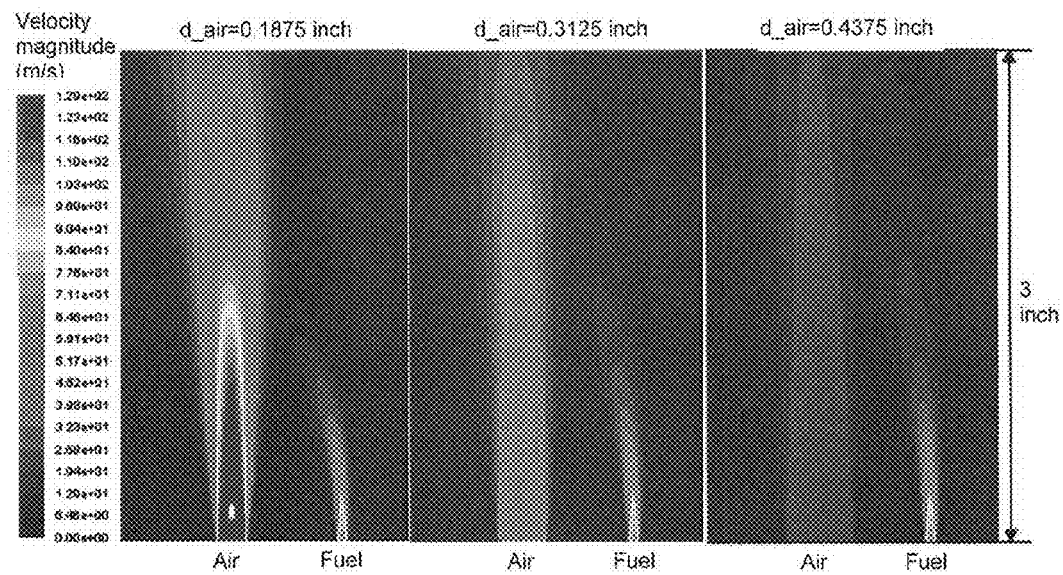
(b) Effect of air injection diameter
Figs. 2(a) and (b)

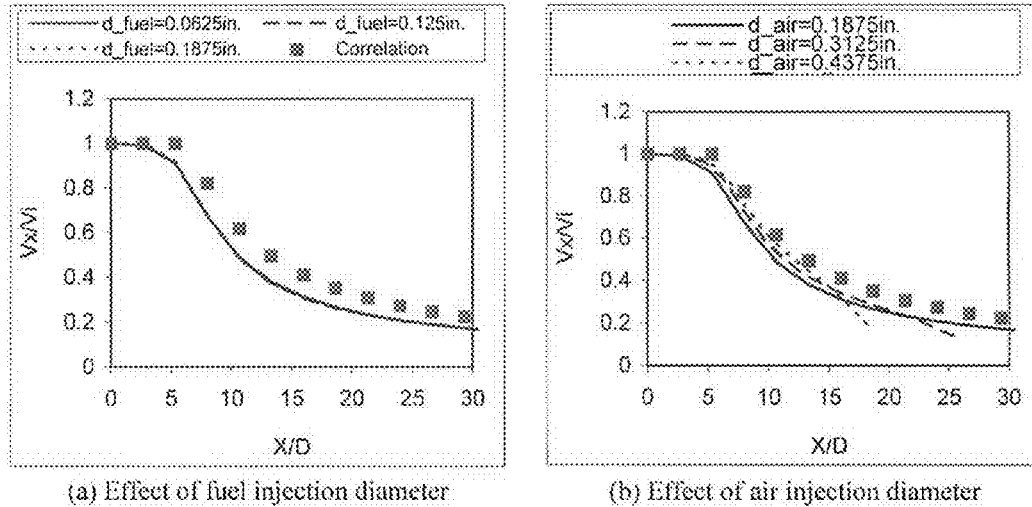
Figs. 3(a) and (b)
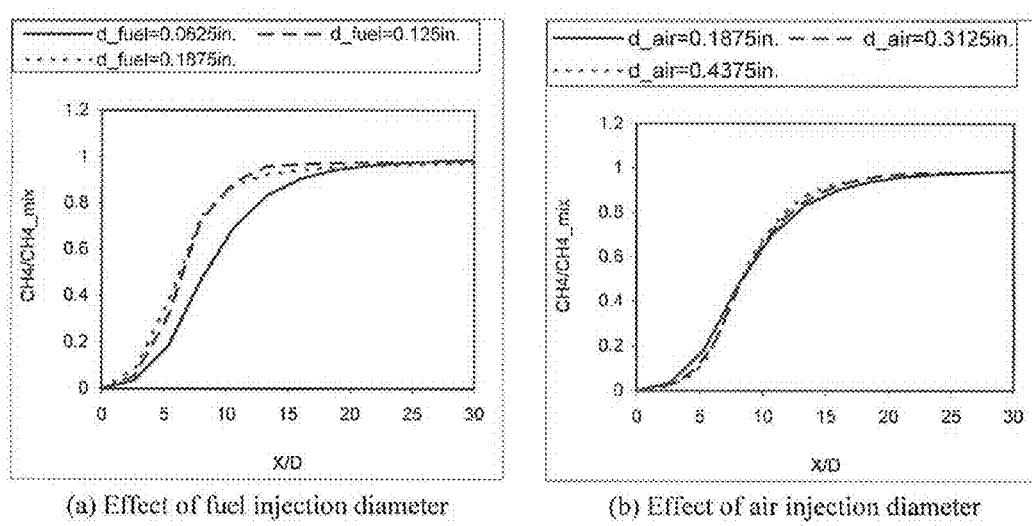
Figs. 4(a) and (b)

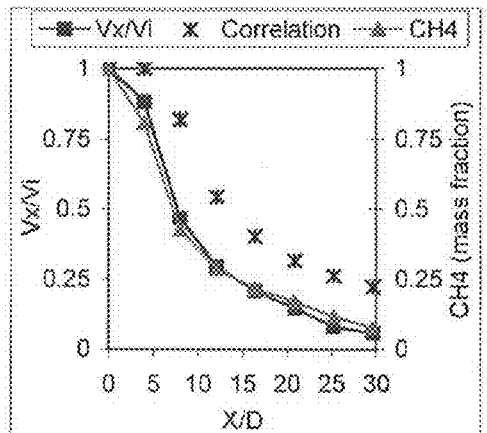
(a) d_fuel=0.0625 inch, d_air=0.1875 inch
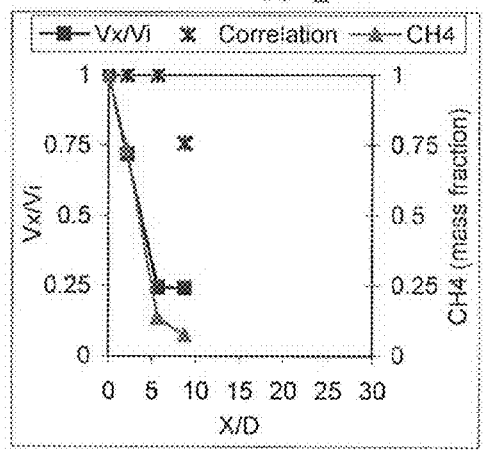
(b) d_fuel=0.125 inch
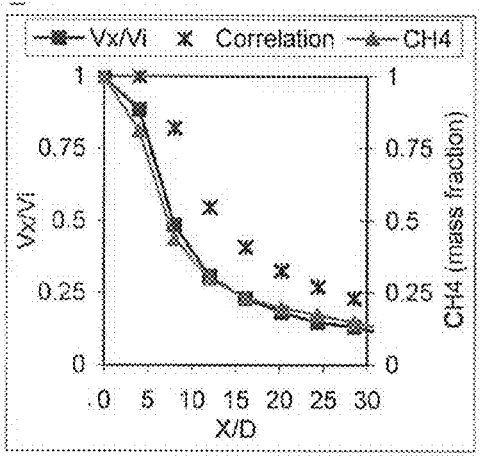
(d) d_air=0.3125 inch
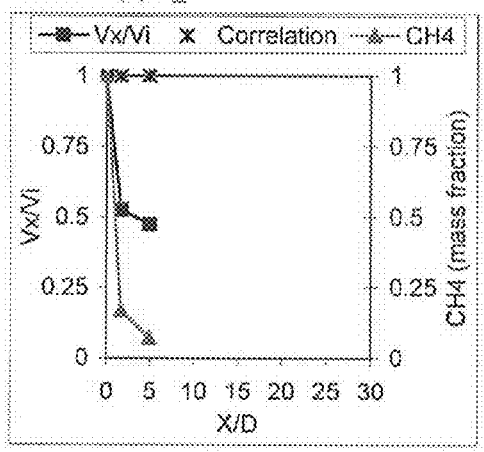
(c) d_fuel=0.1875 inch
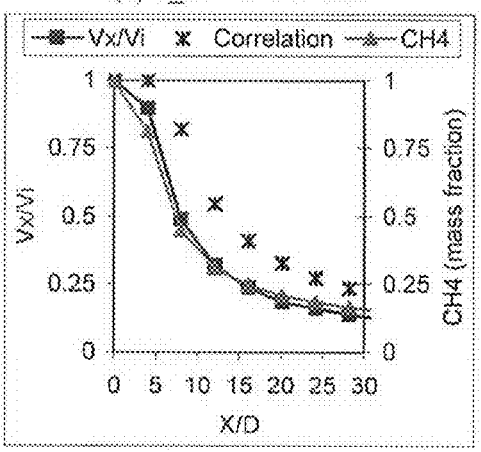
(e) d_air=0.4375 inch
Figs. 5(a) to (e)

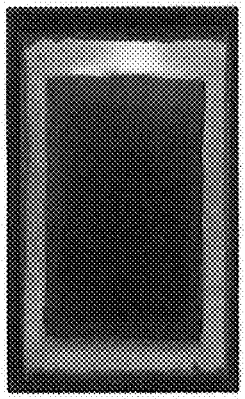
(a) Phi=0.7 (premixed, d_(air+fuel)=0.1875in.
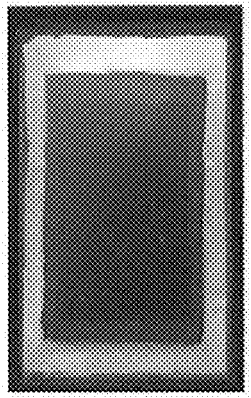
(b) Phi=0.8 (premixed, d_(air+fuel)=0.1875in.
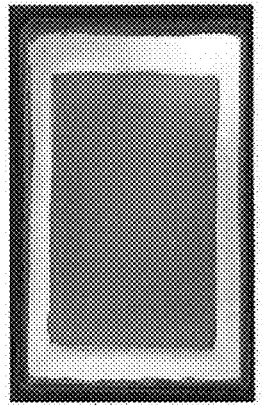
(c) Phi=0.9 (premixed, d_(air+fuel)=0.1875in.
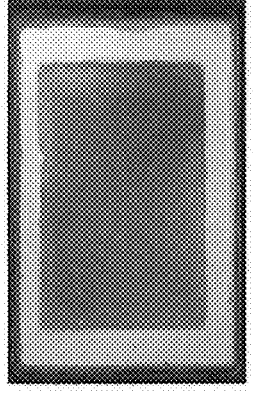
(d) Phi=0.7 (d_air=0.1875in., d_fuel=0.0625in.)
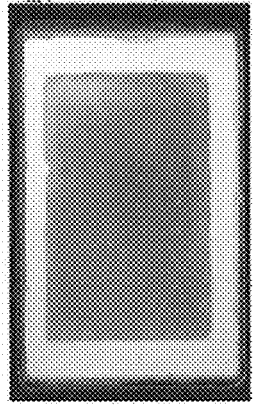
(e) Phi=0.8 (d_air=0.1875in., d_fuel=0.0625in.)
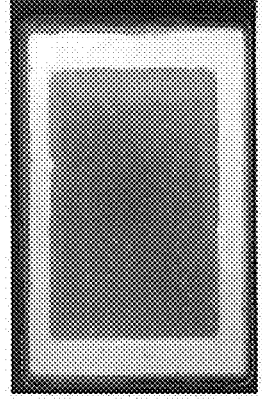
(f) Phi=0.9 (d_air=0.1875in., d_fuel=0.0625in.)
Figs. 6(a) to (f)

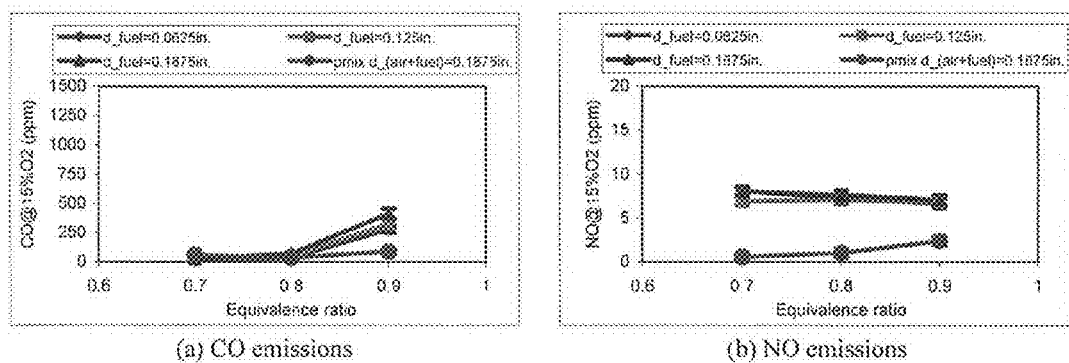
Figs. 7(a) and (b)
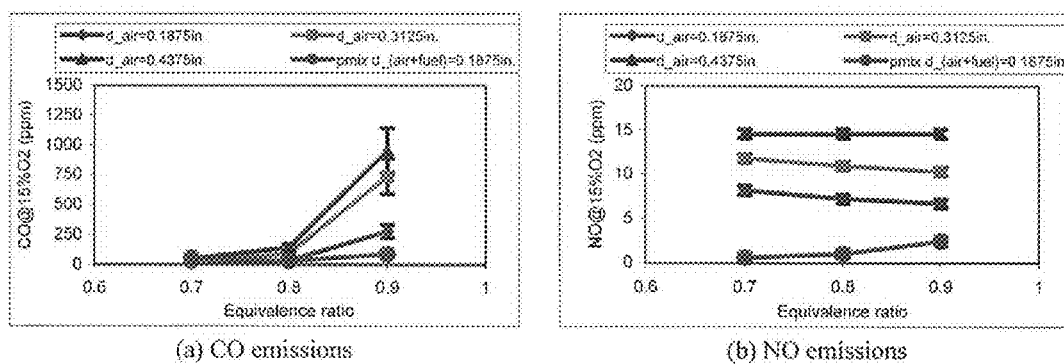
Figs. 8(a) and (b)

FUEL EFFICIENT ULTRA-LOW EMISSION AND IMPROVED PATTERN FACTOR COLORLESS DISTRIBUTED COMBUSTION FOR STATIONARY AND PROPULSION GAS TURBINE APPLICATIONS

PRIORITY

The present application is a divisional application of U.S. patent application Ser. No. 12/686,742, titled "FUEL EFFICIENT ULTRA-LOW EMISSION AND IMPROVED PATTERN FACTOR COLORLESS DISTRIBUTED COMBUSTION FOR STATIONARY AND PROPULSION GAS TURBINE APPLICATIONS", filed on Jan. 13, 2010, published as U.S. Patent Application Publication No. US 2011/0023492 A1 on Feb. 3, 2011, which claims priority under 35 U.S.C. §119(e) from a U.S. provisional application filed on Jan. 13, 2009 titled "Fuel Efficient Ultra Low Emission Colorless Distributed Combustor for Gas Turbine Application in Stationary and Propulsion Systems" and assigned U.S. Provisional Application Ser. No. 61/144,295; the entire contents of each of which are incorporated herein by reference.

STATEMENT REGARDING FEDERALLY SPONSORED RESEARCH

The invention described herein was made with government support under contract N000140710911 awarded by the Office of Naval Research. The government has certain rights in the invention described herein.

RELATED PATENT APPLICATION

The present application is related to a PCT application filed on Oct. 30, 2009 titled "METHOD AND SYSTEM FOR RECOVERING SULFUR IN THE THERMAL STAGE OF A CLAUS REACTOR" and assigned PCT/US2009/62758, published as WO 2010/062682 A1 on Jun. 3, 2010, the entire contents of which are incorporated herein by reference.

PUBLISHED WORKS INCORPORATED HEREIN BY REFERENCE

The following six published words describe inventive concepts attributed to the inventor of the present application, Ashwani K. Gupta. The published works and their described inventive concepts are all incorporated herein by reference.

The present application is directed to subject matter described in V. Arghode and A. K. Gupta: Investigation of Fuel/Air Mixing Characteristics in a CDC Combustor, Proc. $19^{th}$ International Symposium on Air Breathing Engines (ISABE), Montreal Canada, Sep. 7-11, 2009; the entire contents of which are incorporated herein by reference.

The present application is also directed to subject matter described in V. Arghode, A. K. Gupta, and K. H. Yu: Investigation of Non-Premixed and Premixed Distributed Combustion for GT Application, $48^{th}$ AIAA Aerospace Sciences Conference, Orlando, Fla., Jan. 3-7, 2010, Paper No.: AIAA 2010-1353; the entire contents of which are incorporated herein for reference.

The present application is also directed to subject matter described in V. Arghode and A. K. Gupta: Colorless Distributed Combustion (CDC): Effect of Flowfield Configuration, Appl Energy (2009), doi:10.1016/j.apenergy.2009.09.032; the entire contents of which are incorporated herein by reference.

The present application is also directed to subject matter described in V. Arghode, A. K. Gupta, and K. H. Yu: Effect of Confinement on Colorless Distributed Combustion for Gas Turbine Application, AIAA $45^{th}$ AIAA/ASME/SAE/ASEE Joint Propulsion Conference, Denver, Colo., Aug. 2-5, 2009; the entire contents of which are incorporated herein for reference.

The present application is also directed to subject matter described in V. Arghode, and A. K. Gupta: Colorless Distributed Combustion (CDC): Effect of Flowfield Configuration, $47^{th}$ AIAA Aerospace Sciences Conference, Orlando, Fla., Jan. 5-8, 2009, Paper No.: AIAA 2009-0253; the entire contents of which are incorporated herein for reference.

The present application is also directed to subject matter described in V. Arghode and A. K. Gupta: Colorless Distributed Combustion (CDC) for Gas Turbine application, RTO NATO Meeting, Montreal, Canada, October 2008; the entire contents of which are incorporated herein for reference.

The present application is also directed to the subject matter described in V. Arghode and A. K. Gupta: Numerical Simulations for CDC Combustor development, $7^{th}$ Intl. Symposium on High Temperature Air Combustion and Gasification, Phuket, Thailand, Jan. 13-16, 2008; the entire contents of which are incorporated herein for reference.

TECHNICAL FIELD

The present disclosure relates to a method and system for achieving uniform and controlled thermal field in high intensity combustion chambers with no visible flame (called colorless distributed combustion (CDC), or green flame combustion (called green combustion), or green combustion turbine). The method has significant benefits for applications in gas turbine combustion, power and propulsion applications wherein ultra-low pollution emission (emission of oxides of nitrogen (NOx), CO and carbon (soot) are desired without use of any catalyst or pollution control equipment. The method also provides benefits for uniform thermal field in the entire combustion chamber to improve the pattern factor of the hot gases at entrance to the turbine and for the combustion chamber to be called an Isothermal Reactor Combustion Chamber. The CDC method of combustion gives superior performance and can also be used as green combustion turbine in gas turbine applications. Different methods and systems are given to achieve CDC or green combustion that results in complete combustion of fuel with low uniform thermal field in the combustion chamber, low emissions, low noise levels and significantly improves turbine blade life without any maintenance. The uniform thermal field in the combustor according to the present disclosure alleviates local burnout or thermal fatigue of the combustor to provide low noise, energy savings and longer life of combustor and blades of combustion turbines.

BACKGROUND

A combustor is a component or area of a gas turbine, ramjet or pulsejet engine where combustion takes place. It is also known as a burner or flame. In a gas turbine engine, the main combustor or combustion chamber is fed high pressure air by the compression system and feeds the hot exhaust into the turbine components of the engine to produce power. The turbine can also be used as a gas generator.

Combustors are designed to contain and control the burning fuel-air mixture. The combustor normally consists of three components: an outer casing that acts as a high pressure container, the combustion chamber itself which contains the flame and the fuel injection system.

There are two categories of combustors, annular and can. Can combustors look like cans and are mounted around the shaft in an engine. They can be easily removed for maintenance and provide convenient plumbing for fuel Annular combustors are more compact and embedded deep within the engine's casing. Modern jet engines usually have annular combustors.

A main concern in the design of gas turbine combustors is to achieve low pollutant emissions and better pattern factor (uniform thermal field at the combustor exit port). In this regard, modern jet engines with double annular combustors are being introduced to reduce emissions. Additionally, many combustion techniques have been investigated to achieve low pollutants emission (NOx, CO) for gas turbine combustors. Some examples include rich burn—quick quench—lean burn (RQL), catalytic combustion, lean direct injection, and ultra lean premixed combustion.

SUMMARY

The present disclosure describes the use of Colorless Distributed Combustion (CDC), which is based on the principle of high temperature air combustion (HiTAC), in the design of a gas turbine combustor. CDC has shown significant reduction of NOx and CO emissions in addition to improved pattern factor, stable combustion and noise reduction in a gas turbine combustor. The common key feature to achieve reactions in CDC mode is the separation and controlled mixing of higher momentum air jet and the lower momentum fuel jet. The CDC mode and also the green combustion turbine mode require fuel air preparation via internal or external hot gas recirculation into the fresh reactant mixture from the combustion chamber.

The present disclosure also discusses an investigation into the effect of fuel and air jet mixing in understanding the characteristics of CDC combustion and for developing fuel-efficient gas turbine combustors for stationary and propulsion and stationary applications. Additionally, effect of fuel and air injection diameter which was investigated numerically and experimentally for the CDC combustor is described in the present disclosure. In numerical investigation it was observed that the larger fuel injection diameter results in faster mixing between air and the fuel jet. However, almost similar NO and CO levels were observed with change in fuel injection diameter experimentally. This may be due to faster mixing for different fuel injection diameter before the entrainment of the recirculated gases and ignition. With change in air injection diameter, the mixing between the air and fuel jet reveals similar profile over the range of diameters examined.

For smaller air injection diameter, better turbulence mixing is expected to result in the alleviation of hot spot regions in the combustor. These hot spot regions in the combustor cause local burn out of the combustor which reduces the life of the combustor. In experimental investigation NO and CO emissions were observed to increase with increase in air injection diameter. Premixed mode of combustion, under the well prepared fuel mixture conditions according to the present disclosure, reveals almost colorless flame with ultra-low NOx emissions (less than 1 ppm) and very low CO emissions. Under certain conditions green color was also achieved. This mode is called green combustion turbine mode.

The combustor according to the present disclosure does not require any preheat of the air other than the available air from the compressor that is preheated to some elevated temperatures. The combustor also does not require the use of any catalyst to achieve ultra low emissions of NOx and CO. Further, the combustor according to the present disclosure achieves zero emission of NOx, CO, hydrocarbons and soot with the carefully prepared fuel-air mixture which is introduced into the combustor with controlled mixing with the hot gases inside the combustor prior to the mixture ignition. The hot gases could be from within the combustor via proper injection of fuel and air into the combustor, or they could be recirculated gases from the combustor exit port, or from the exhaust of the turbine in a gas turbine engine recirculated back to the head end of the combustor.

The present disclosure further describes many different embodiments for a colorless distributed combustion reactor or green combustion turbine for gas turbine combustion or isothermal reactor for improved performance of gas turbine combustion engines that are configured and designed for providing the superior pattern factor (uniform thermal field in the entire combustion zone of the combustor so that the flame is distributed combustion) and reduction of pollutants emission. According to the present disclosure, the colorless distributed combustion can be achieved with fuel and air entering the combustion chamber as non-premixed, or pre-mixed (i.e., fuel plus heated air or oxidizer fluid) or partially premixed. The fuel and air could also be mixed with the hot combustion product gases from the combustor exit port to preheat the reactants. This mode is referred to as preheating of the reactants with external combustion products gas recirculation. Alternatively, it could be preheated using internal recirculation of the hot gases mixing with the incoming air and fuel prior to ignition of the mixture.

These and other advantages and inventive concepts are described herein with reference to the drawings and the detailed description which follows.

BRIEF DESCRIPTION OF THE DRAWINGS

FIG. 2 illustrates velocity contours in the plane of air and fuel injection ports for variation of (a) fuel injection diameter and (b) air injection diameter;

FIG. 3 shows graphs illustrating centerline velocity decay of air jet (a) effect of fuel injection diameter; and (b) effect of air injection diameter;

FIG. 4 shows graphs illustrating centerline methane mass fraction variation for air jet (a) effect of fuel injection diameter; and (b) effect of air injection diameter;

FIGS. 5(*a*)-(*e*) show graphs illustrating centerline velocity and CH4 concentration decay for the fuel jet for various dimensions of the fuel injection and air injection diameters;

FIGS. 6(*a*)-(*f*) includes several global pictures of the premixed and the non-premixed reaction zone for various dimensions of the fuel injection and air injection diameters;

FIG. 7 shows graphs illustrating effect of fuel injection diameter on (a) CO and (b) NO emissions;

FIG. 8 shows graphs illustrating effect of air injection diameter on (a) CO and (b) NO emissions.

DETAILED DESCRIPTION

Figure 1:
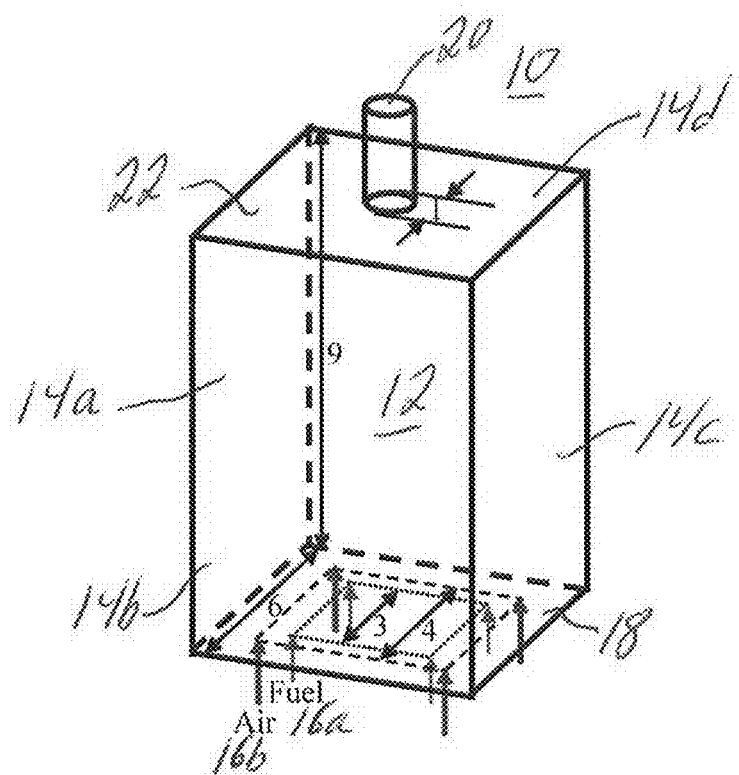
FIG. 1 illustrates a schematic diagram with dimensions shown in inches of a colorless distributed combustion gas turbine combustor according to the present disclosure.

A description of Colorless Distributed Combustion (CDC) and green combustion turbine is provided in Section I. Section I further describes a study which investigated numerically the effect of fuel injection diameter and air injection diameter on the fuel/air mixing behavior at constant flow rates corresponding to heat load of 25 kW and equivalence ration of 0.8 for methane fuel.

Section II describes many different embodiments for a colorless distributed combustion reactor or green combustion gas turbine combustor or reactor for improved performance of gas turbine combustion engines that are configured and designed for providing the superior pattern factor (uniform thermal field in the combustion zone) and a reduction in pollutants emission. According to the present disclosure, the colorless distributed combustion can be achieved with fuel and heated air entering the combustion chamber as non-premixed, or premixed. Two different shapes of the combustor are described and shown, including rectangular and cylindrical shaped combustors.

Colorless Distributed Combustion (CDC) and CDC Combustor

Colorless Distributed Combustion

Colorless Distributed Combustion (CDC) possesses significant advantages for ultra low NOx and CO emissions in gas turbine combustors used for stationary and propulsion applications. The key feature to achieve CDC characteristics is the separation of strong (higher momentum) air jet and weak (lower momentum) fuel jet and their controlled interaction. In CDC mode both air and fuel jets entrain the surrounding product gases and further downstream the weak fuel jet gets entrained and mix with the strong air jet to spontaneously ignite and react in distributed regime. The amount of product gases entrained by the air and fuel jets at the point of confluence governs the local temperature and oxygen concentration and hence the ignition delay time for spontaneous ignition.

B. Effect of Fuel Injection Diameter and Air Injection Diameter

A detailed study of fuel/air mixing and entrainment behavior is critical to achieve reactions in CDC regime. In this investigation, the effect of fuel injection diameter and air injection diameter was investigated numerically on the fuel/air mixing behavior at constant flow rates corresponding to heat load of 25 kW and equivalence ratio of 0.8 for methane fuel. These characteristics are quite typical of gas turbine combustion conditions. Furthermore, experiments in reacting conditions were performed to examine the effect of fuel/air mixing on the emissions of NOx and CO from the combustor.

It was observed that the higher air injection diameter resulted in significantly higher levels of NOx and CO whereas change in fuel injection diameter had minimal effect on the NOx and CO emissions. The results were also compared with the premixed combustion mode. The premixed combustion mode theoretically provides perfect mixing and minimum hot spot regions and hence results in lowest NOx and CO levels. Very low visible emissions were observed for premixed mode as compared to the non-premixed combustion mode. Under certain conditions the color of the flame is green to provide applications as green combustion turbine in gas turbine engines with uniform thermal field characteristics in the entire combustion zone.

C. Geometry of Combustor

FIG. 1 shows a schematic of a combustor 10 used for the study according to the present disclosure. The dimensions of the combustor 10 are shown in inches in FIG. 1. The combustor 10 has a combustion chamber 12 and optical access from three sides of the combustor 10. Optical access is from the three vertical sides 14*a-c* in FIG. 1. A fourth vertical side 14*d* has steel plate with port for mixture igniter. Fuel and air injection holes 16*a, b* are on the diagonals of a bottom side 18 of the chamber 12 in the sets of four and the combustion product gas exit or exhaust port 20 is on a top side 22. Different sizes of fuel and air injection ports can be used to examine the effect of fuel/air mixing on CDC characteristics.

In one present study according to the present disclosure, three air injection port sizes and three fuel injection port sizes were investigated. The distance between the air and fuel injection ports is same for all the cases. One premixed flow configuration (smallest air injection port size) has also been investigated. Premixed flow configuration allows for the investigation of the case where minimum hot spots are present for comparison with other non-premixed cases.

The experimental condition for the six cases under investigation is presented in Table 1.

TABLE 1

Dimensions and the velocity for different cases under investigation.

|  | d_air (in.) | d_fuel (in.) | Air inj. vel. m/s | | | Fuel inj. vel. (m/s) | Momentum ratio (air/fuel) (phi = 0.8) |
|  |  |  | Phi = 0.7 | Phi = 0.8 | Phi = 0.9 |  |  |
| --- | --- | --- | --- | --- | --- | --- | --- |
| Baseline case | | | | | | | |
| Case 1 | 0.1875 | 0.0625 | 146.3 | 128.0 | 113.8 | 97.3 | 28.19 |
| Effect of fuel injection diameter | | | | | | | |
| Case 2 | 0.1875 | 0.125 | 146.3 | 128.0 | 113.8 | 24.3 | 112.3 |
| Case 3 | 0.1875 | 0.1875 | 146.3 | 128.0 | 113.8 | 10.8 | 253.7 |
| Effect of fuel injection diameter | | | | | | | |
| Case 4 | 0.3125 | 0.0625 | 52.7 | 46.1 | 41.0 | 97.3 | 10.8 |
| Case 5 | 0.4375 | 0.0625 | 26.9 | 23.5 | 20.9 | 97.3 | 5.14 |
| Premixed | | | | | | | |
| Case 6 | 0.1875 | | 157.1 | 138.8 | 124.6 | — | — |

The case with smallest air (diameter=0.1875 inch) and fuel (diameter=0.0625 inch) port is considered as the baseline case and is used for examining the effect of air and fuel injection diameter by changing one parameter at a time. The mass flowrates of air and fuel (methane) corresponds to heat load of 25 kW (heat release intensity of 5 MW/m$^3$-atm). The temperature for both air and fuel jet is 300 K and operating pressure is 1 atm.

D. Numerical Analysis

The jet profile and mixing between fuel and air under non-reacting condition is examined for three air and fuel injection port sizes. The flowfield and species distribution is solved using a steady state, implicit, finite volume based method. SIMPLE algorithm is used for pressure velocity coupling. Full hexahedral grid is used to minimize the grid size and appropriate refinement of grid is performed in the regions with higher gradients. Geometrical symmetry is used to reduce the computational time and only one-eighth of the geometry with grid size of about 0.5 million cells was modeled. Realizable k-e model with standard wall functions is used to model turbulence. Realizable k-e model has been shown to provide more accurate prediction of profile and spreading of non-reacting round jets. Convergence is obtained when the residuals for all the variables are less than 1e-04. The centerline jet velocity profile obtained from the numerical solution is compared with the correlation given in equation 1. For all simulations commercial software FLUENT code is used.

$$\frac{V_x}{V_i} = 6.575\left(\frac{X}{D}\right)^{-1} \quad (1)$$

$X$ = distance along the centerline of the jet, $V_x$ = jet centerline velocity $D$ = jet diameter, $V_i$ = initial jet velocity E. Experimental Setup and Measurements The combustor was allowed to run for about 20 minutes in each configuration before taking the experimental data. The exhaust gas sample was collected using an iso-kinetic, water-quenched sampling probe. The NO concentration was measured using the chemiluminescence gas analyzer, CO concentration was measured using the non-dispersive infrared analyzer, and $O_2$ concentration (used to correct the NO and CO emissions at standard 15% oxygen concentration) was measured using the galvanic cell method. The emission readings were observed to stabilize within 3 minutes for all changes in experimental condition (for example, change in equivalence ratio for the same configuration). The experiments were repeated three times for each configuration and the uncertainty was estimated to be about ±0.5 ppm for NO and ±20% for CO emissions. A digital camera was used to record the global flame images for all the configurations.

F. Sample Experimental Results

FIG. 2(a) shows the velocity contour plots along the diagonal plane (containing the air and fuel injection ports) for the effect fuel injection diameter. It can be observed that for smaller fuel injection diameter (higher momentum of fuel jet) the fuel jet decay is delayed. The point of confluence of air and fuel jet shifts to downstream location with increase in momentum of fuel jet. The change in fuel injection diameter has minimal effect on the air jet characteristics as observed from FIG. 2(a).

The centerline velocity decay plot of air jet for different fuel injection diameters also reveals almost similar profiles of the air jet (see FIG. 3(a)). It can also be observed that a fair matching between the centerline velocity of air jet and correlation (equation 1) is also obtained (see FIG. 3(a)). The centerline methane mass fraction profile for the air jet is presented in FIG. 4(a). It can be observed that early mixing between fuel and air jet is obtained for the case with lower fuel jet momentum (larger fuel injection diameter) (as also observed from the velocity contours of FIG. 3(a)). However the (air jet centerline) methane mass fraction profiles are similar for fuel injection diameter of 0.125 inch and 0.1875 inch.

The centerline velocity decay and methane mass fraction profile along the fuel jet is presented in FIGS. 5(a), (b) and (c) for the effect of fuel injection diameter. It can be observed that for higher momentum of fuel jet the velocity and mass fraction profiles are similar and closer to the corresponding velocity decay profile for free jets (equations 1). However as the momentum of fuel jet is decreased (diameter is increased) the jet decays rapidly as compared to the corresponding free jets. This implies that the cross flow (due to entrainment due to air jet) has significant effect on the decay of fuel jet at larger diameter. At larger diameter the methane mass fraction decay is more than the velocity decay. This may be due to higher velocity of the cross flow due to air jet.

FIG. 2(b) shows the velocity contour along the diagonal plane (containing the air and fuel injection ports) for the effect of air injection diameter. It can be observed that for larger air injection diameter the point of confluence between air and fuel injection port shifts to the downstream location. This may be due to relatively weaker cross flow for the case of larger air injection diameter which delays the decay of fuel jet. The centerline velocity decay for the three air injection port diameters is shown in FIG. 3(b). It can be observed that a fair matching between the centerline velocity decay for free jet (equation 1) is observed.

The methane mass fraction profile along the centerline of air jet is presented in FIG. 4 (b). It can be observed that the centerline methane mass fraction profiles are almost similar with increase in air injection diameter. Even though the fuel/air mixing is delayed with increase in air injection diameter (see, FIG. 2(b)) the methane mass fraction profiles scaled with the air injection diameter reveals similar profiles. It may be noted that the recirculation of product gases also increases linearly with air jet diameter.

Hence it appears that the amount of recirculated gases for same methane mass fraction will be similar even with increase in air injection diameter. However the turbulent mixing for the smaller air injection diameter is better as compared to larger air injection diameter (mixing time ~D/Umean). Hence it is expected that the case with smaller air injection diameter will result in better mixing and lesser hot spot regions.

The decay of velocity and methane mass fraction for the fuel jet is presented in FIGS. 5 (a), (d) and (e). It can be observed that the velocity and methane mass fraction decay profiles are similar however the decay is higher as compared to the free jet. As the air injection diameter is increased the velocity decay profile for the fuel jet moves closer the free jet decay profile. This may be due to relatively weaker cross flow present for the case with larger air injection diameter.

G. Experimental Observations

Global flame photographs for the baseline non-premixed flame (case 1) and premixed flame (case 6) were taken as shown in FIG. 6. It can be observed that for both non-premixed and premixed cases the flame appears to be uniformly distributed. Very low visible emissions are observed for premixed flame at the equivalence ratio of 0.7 and flame appears to be almost colorless. As the equivalence ratio is increased the visible emission is also observed to increase for both non-premixed and the premixed mode.

Higher glow from the combustor walls is also observed with increase in the equivalence ratio, and this can be related to higher (adiabatic) flame temperatures with increase in equivalence ratios. Since both air and fuel are injected from the bottom side of the combustor the reaction proceeds mostly along the length of the combustor towards the top side, which results in relatively high temperature product gases present on the top side of the combustor (also seen from the higher glow from the combustor wall on the top side of the combustor).

FIG. 7 shows the emissions of carbon monoxide (CO) and nitric oxide (NO) with change in fuel injection diameter. It can be observed that both CO and NO emissions are lowest for the premixed mode of combustion. For the premixed configuration (case 6), the NO levels are very low (about 1 ppm). This can be attributed to minimum hot-spots regions associated with premixed mode of combustion. For non-premixed mode changing fuel injection diameter has minimal effect on both NO and CO emissions as observed from FIG. 7. The figure also reveals that proper mixture preparation can provide zero NO and CO emission and also uniform thermal field in the entire combustion zone to avoid the hot spot zones.

It may be noted that for larger fuel injection diameter the fuel jet mixes earlier with the air jet (see FIGS. 2(a) and 4(a)). The ignition of fuel/air mixture will take place after sufficient amount of product gases are entrained and the mixture temperature rises above the auto-ignition temperature. Hence for the present case it is possible that the fuel/air mixing is sufficiently faster before the ignition of fuel take place.

With increase in air injection diameter, the turbulent mixing time significantly reduces which may lead to variable stoichiometry and more hot-spot regions and hence result in higher NO and CO levels. For all the cases CO level increases significantly with increase in equivalence ratio. This is due to lack of availability of oxygen as well as dissociation of $CO_2$ at high temperatures (at higher equivalence ratio). The NO levels for non-premixed operation (cases 1-5) are almost constant with increase in equivalence ratio.

It may be noted that in non-premixed combustion reaction takes place at an overall equivalence which is higher than (close to stoichiometry) the inlet equivalence ratio. Hence in the reaction zone is stabilized at similar equivalence ratio the NO level will be almost similar with increase in inlet equivalence ratio (see FIGS. 7(b) and 8(b)). For premixed combustion as the reaction zone is stabilized at inlet equivalence ratio, hence with increase in equivalence ratio the NO concentration is observed to increase (see FIGS. 7(b) and 8(b)).

CDC Gas Turbine Combustor

A description will now be provided with reference to FIGS. 9-45 of different embodiments for a colorless distributed combustion reactor or green combustion gas turbine combustor or reactor for improved performance of gas turbine combustion engines that are configured and designed for providing the superior pattern factor (uniform thermal field in the combustion zone) and a reduction in emission pollutants. According to the present disclosure, the colorless distributed combustion can be achieved with fuel and air (i.e., combustible and oxidizer fluids, respectively) entering the combustion chamber as non-premixed, or premixed.

FIGS. 9-45 illustrate diagrams of various embodiments of a gas turbine CDC combustor according to the present disclosure. Each embodiment of the gas turbine combustor includes a housing (either rectangular or cylindrical) defining a combustion chamber, at least one first fluid injection port for introducing heated air (i.e., heated oxidizer fluid from the compressor) at temperatures of about 400-800K depending on the pressure ratio of the combustor, or an oxidizer fluid into the combustion chamber. The heated air or heated oxidizer fluid can include recycled fluids which have exited the combustion chamber from an exit port mixed with a diluted oxygen-concentrated air from the compressor.

Each embodiment also includes at least one second fluid injection port for introducing fuel (i.e., combustible fluid) into the combustion chamber. Several embodiments are also described wherein the heated air (or heated oxidizer fluid) and fuel (i.e., combustible fluid) are premixed or non-premixed and introduced into the combustion chamber from at least one fuel/air injection port. A description of each embodiment with reference to the figures follows.

Figure 9:
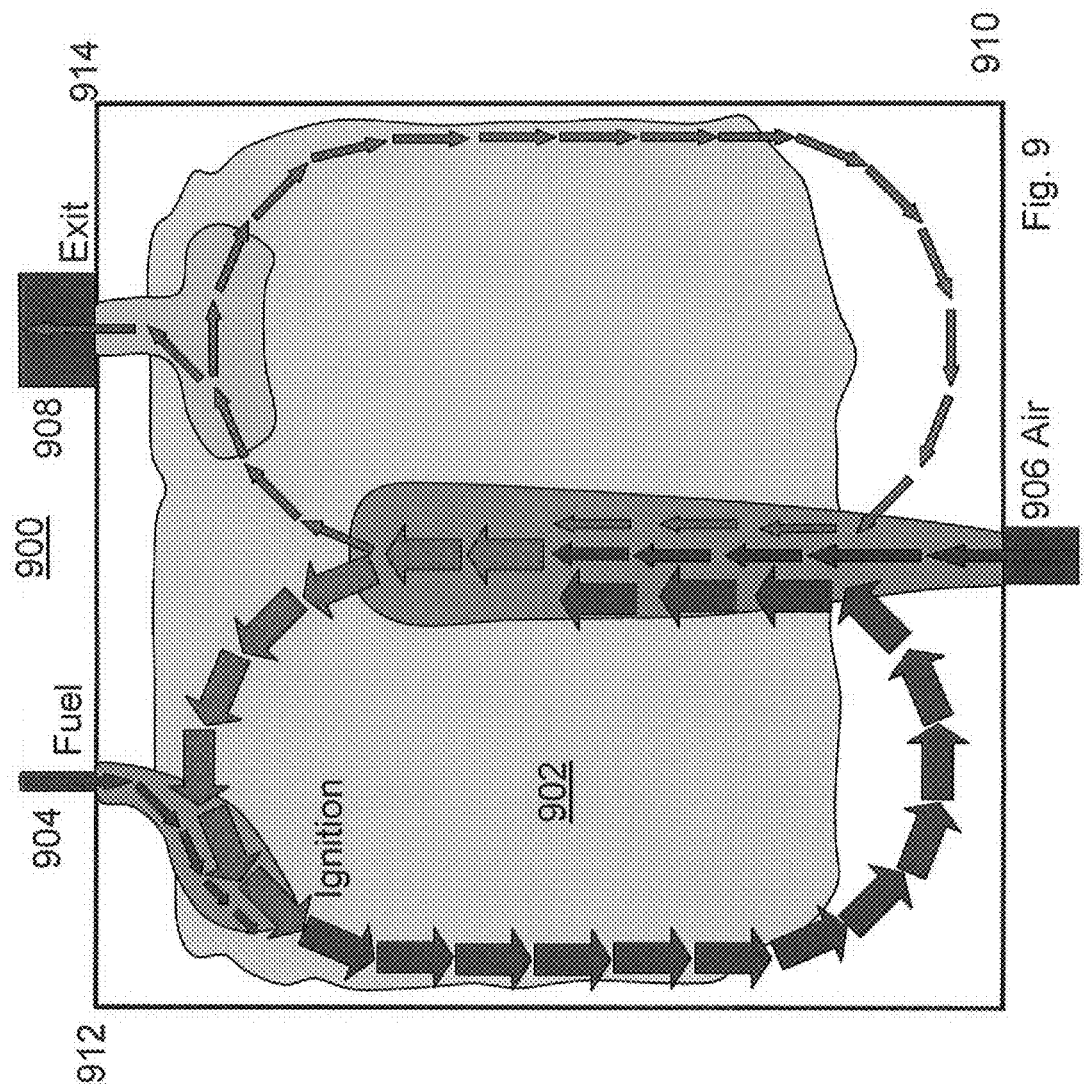
FIGS. 9-45 illustrate diagrams of various embodiments of a gas turbine CDC combustor according to the present disclosure.

FIG. 9 illustrates a rectangular gas turbine CDC combustor 900 having a combustion chamber 902, a fuel injection port 904 in fluid communication with the combustion chamber 902, an air injection port 906 in fluid communication with the combustion chamber 902, and an exit port 908 in fluid communication with the combustion chamber 902. The air injection port 906 is located on the bottom side 910 of the combustor 900 along the central axis thereof. The fuel injection port 904 is located on the top, left side 912 of the combustor 900, and the exit port 908 is located on the top, right side 914 of the combustor 900. It is contemplated that the gas turbine combustor 900 and the gas turbine combustors shown by FIGS. 9-25 each have a housing which can have any shape, including rectangular, square, circular, stadium and elliptical. For exemplary purposes, each of these figures illustrates a rectangular housing.

As shown by FIG. 9, an opposed flow configuration is created within the combustion chamber 902 as the fuel enters the combustion chamber 902 from the fuel injection port 904 located on the top side 912 and the heated air enters the combustion chamber 902 from the air injection port 906 located on a bottom side of the combustor 900. Ignition occurs in proximity to the fuel injection port 904 and colorless distributed combustion occurs mainly throughout the combustion chamber 902. A vertical uniform thermal field is created within the combustion chamber 902 on the left side. The combustion byproducts circulate within the combustion chamber 902 in a vertical pattern and exit the combustion chamber 902 via the exit port 908.

Figure 10:
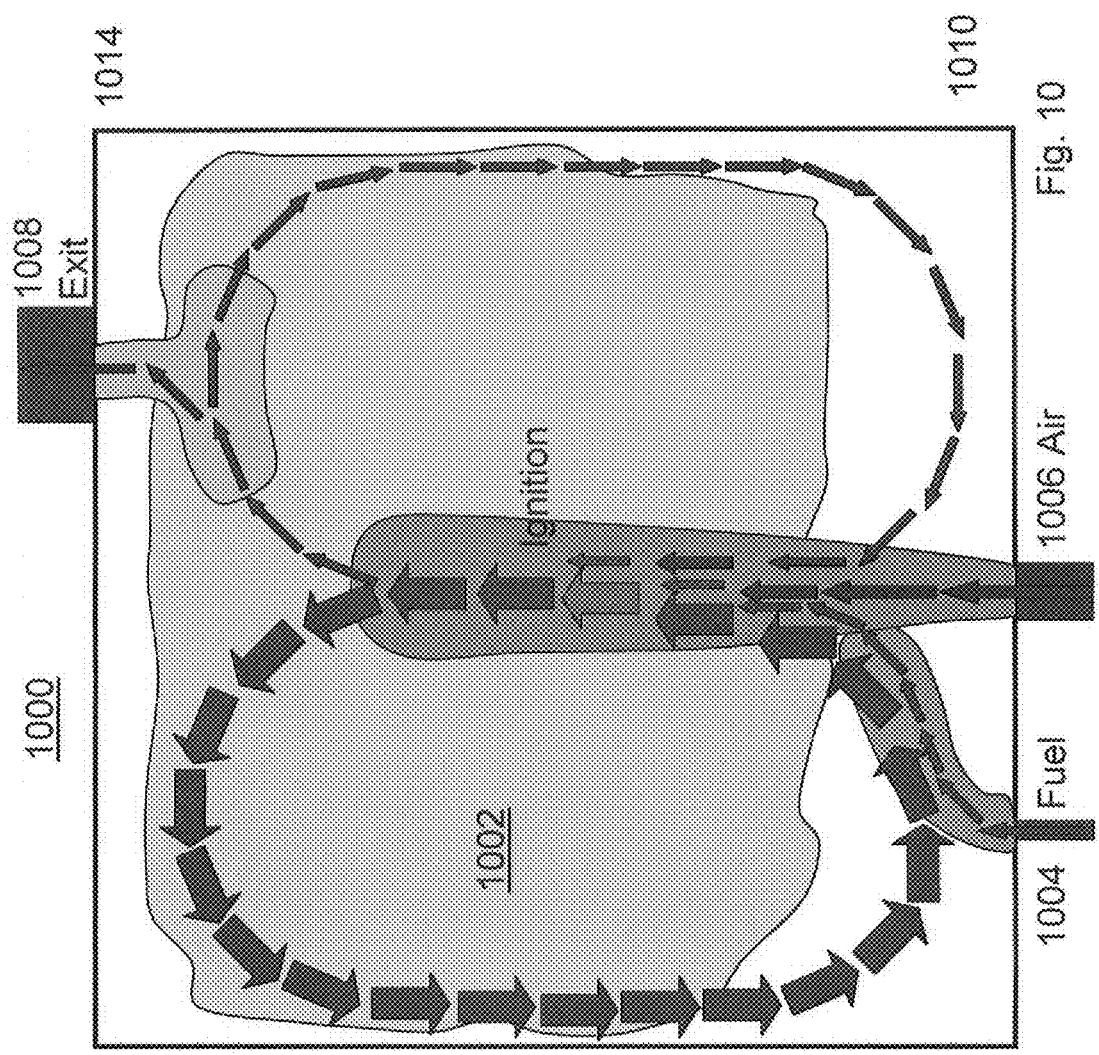

FIG. 10 illustrates a rectangular gas turbine CDC combustor 1000 having a combustion chamber 1002, a fuel injection port 1004 in fluid communication with the combustion chamber, an air injection port 1006 in fluid communication with the combustion chamber, and an exit port 1008 in fluid communication with the combustion chamber. The air injection port 1006 is located on the bottom side 1010 of the combustor 1000 along the central axis thereof. The fuel injection port 1004 is located to the left of the air injection port 1006, and the exit port 1008 is located on the top, right side 1014 of the combustor 1000.

As shown by FIG. 10, a co-flow configuration is created within the combustion chamber 1002 as the fuel enters the combustion chamber 1002 from the fuel injection port 1004 located on the bottom side 1010 of the combustor 1000 and the heated air enters the combustion chamber 1002 from the air injection port 1006 also located on the bottom side 1010 of the combustor 1000. A vertical uniform thermal field is created within the combustion chamber 1002 on the left side. The combustion byproducts circulate within the combustion chamber 1002 in a vertical pattern and exit the combustion chamber 1002 via the exit port 1008. Ignition occurs along the central axis and colorless distributed combustion occurs mainly throughout the combustion chamber 1002.

Figure 11:
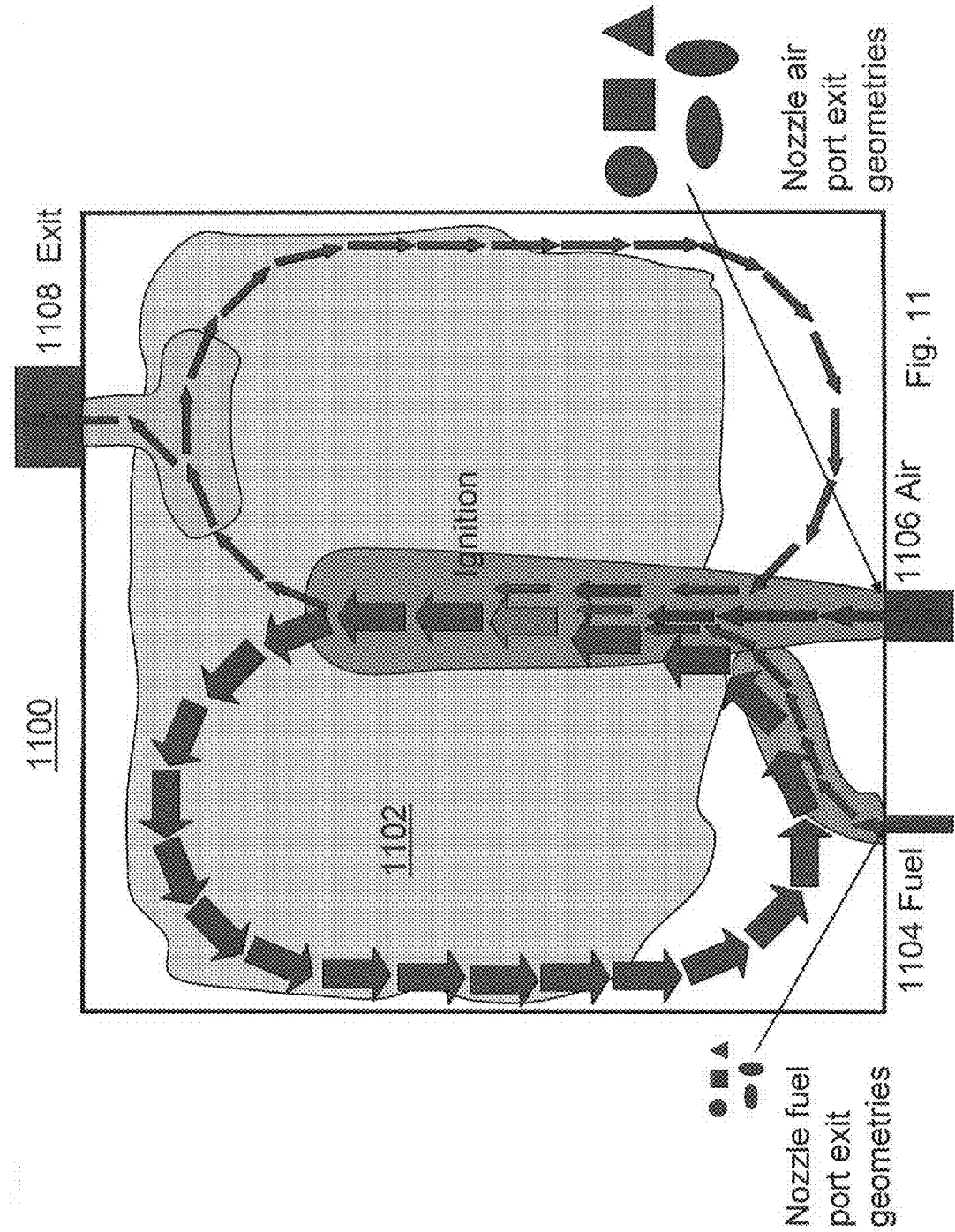

FIG. 11 illustrates a rectangular gas turbine CDC combustor 1100 similar to the CDC combustor 1000. In this embodiment, different nozzle exit geometries are selected for at least one of the fuel and air injection ports 1104, 1106 as shown by FIG. 11. Each nozzle exit geometry produces a different spray or dispense pattern within the combustion chamber 1102. Some shapes for the nozzle exit geometry are shown by FIG. 11. These shapes are shown for illustrative purposes only; other shapes and configurations besides those shown by FIG. 11 are contemplated within the scope of the present disclosure.

Figure 12:
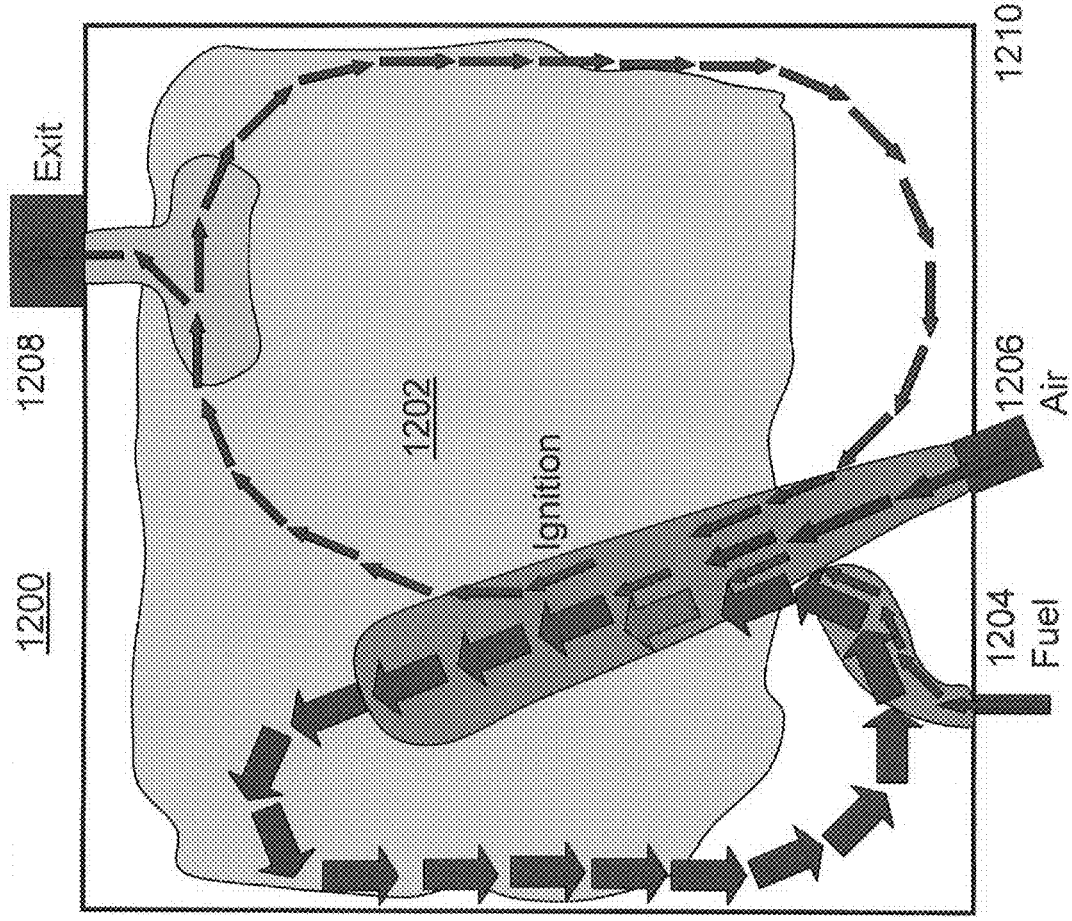

FIG. 12 illustrates a rectangular gas turbine CDC combustor 1200 having a combustion chamber 1202, a fuel injection port 1204 in fluid communication with the combustion chamber, an air injection port 1206 in fluid communication with the combustion chamber, and an exit port 1208 in fluid communication with the combustion chamber. The air injection port 1206 is located on a bottom side 1210 of the combustor 1200 and positioned along a non-perpendicular angle with respect to a horizontal axis of the bottom side 1210. As such, a longitudinal axis of the air injection port 1206 intersects a longitudinal axis of the fuel injection port 1204 at a point within the combustion chamber 1202. The fuel injection port 1204 is located to the left of the air injection port 1206, and the exit port 1208 is located on the top, right side 1214 of the combustor 1200.

As shown by FIG. 12, a co-flow configuration is created within the combustion chamber 1202 as the fuel enters the combustion chamber 1202 from the fuel injection port 1204 located on the bottom side 1210 of the combustor 1200 and the heated air enters the combustion chamber 1202 from the air injection port 1206 also located on the bottom side 1210 of the combustor 1200. A vertical uniform thermal field is created within the combustion chamber 1202 on the left side. The combustion byproducts circulate within the combustion chamber 1202 in a vertical pattern and exit the combustion chamber 1202 via the exit port 1208.

Ignition occurs along an axis which intersects the central axis. Colorless distributed combustion occurs mainly throughout the combustion chamber 1202; a bottom portion of the combustion chamber 1202 does not have any colorless distributed combustion occurring as shown by FIG. 12.

Figure 13:
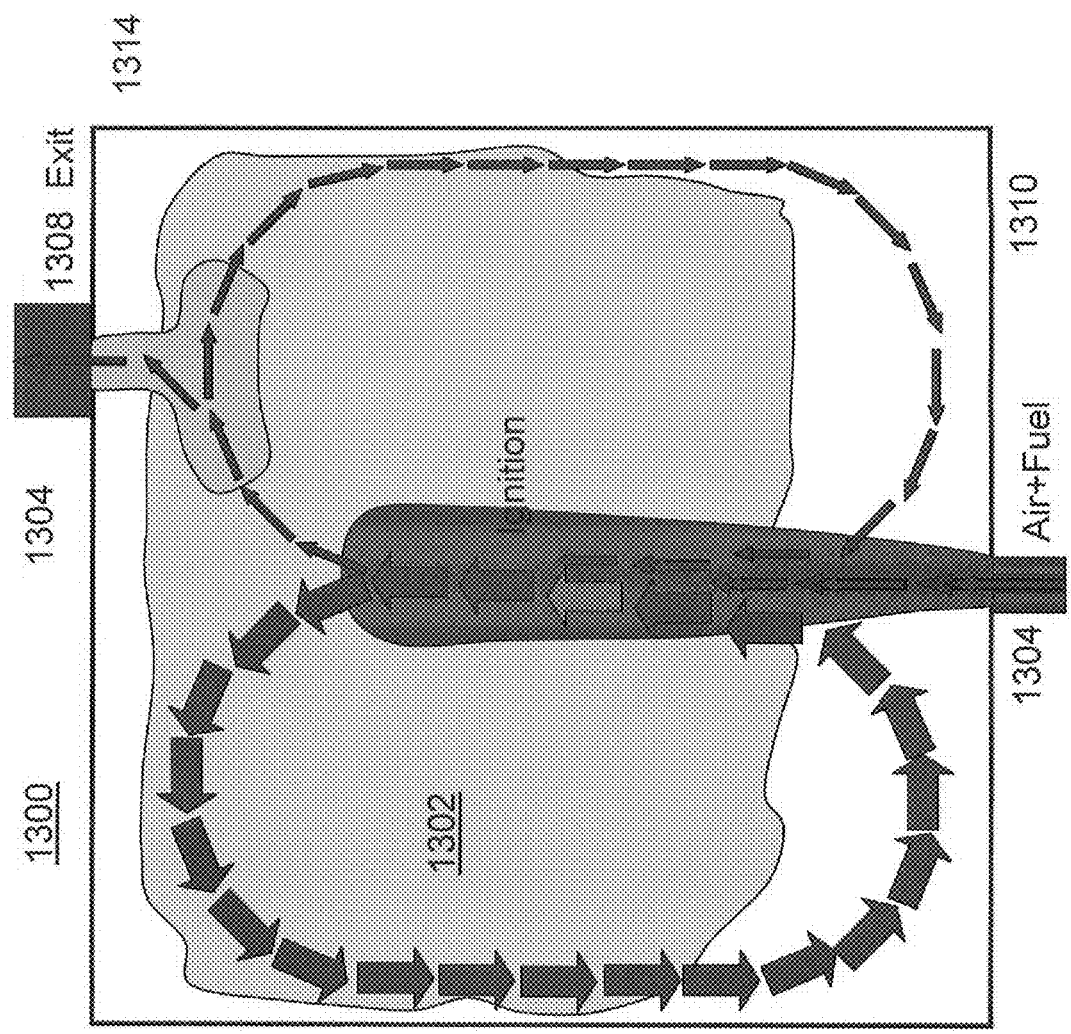

FIG. 13 illustrates a rectangular gas turbine CDC combustor 1300 having a combustion chamber 1302, a fuel/air injection port 1304 in fluid communication with the combustion chamber, and an exit port 1308 in fluid communication with the combustion chamber. The fuel/air injection port 1304 is located on a bottom side 1310 of the combustor 1300 along the central axis thereof. The exit port 1308 is located on the top, right side 1314 of the combustor 1300.

As shown by FIG. 13, a co-annular flow configuration is created within the combustion chamber 1302 as the fuel/air which is premixed enters the combustion chamber 1302 from the fuel/air injection port 1304 located on the bottom side 1310 of the combustor 1300. A vertical uniform thermal field is created within the combustion chamber 1302 on the left side. The combustion byproducts circulate within the combustion chamber 1302 in a vertical pattern and exit the combustion chamber 1302 via the exit port 1308. Ignition occurs along the central axis of the combustor 1300 and colorless distributed combustion occurs mainly throughout the combustion chamber 1302.

Figure 14:
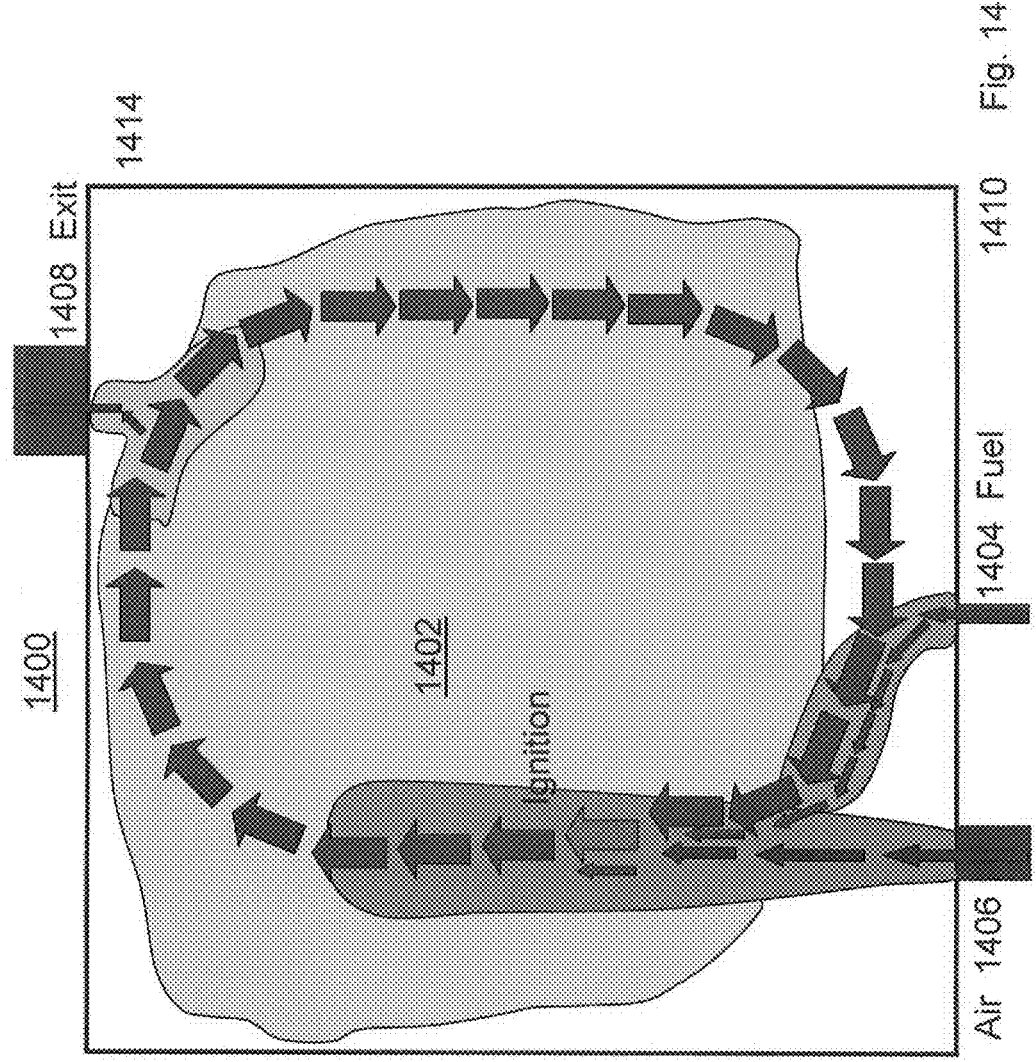

FIG. 14 illustrates a rectangular gas turbine CDC combustor 1400 having a combustion chamber 1402, a fuel injection port 1404 in fluid communication with the combustion chamber, an air injection port 1406 in fluid communication with the combustion chamber, and an exit port 1408 in fluid communication with the combustion chamber. The air injection port 1406 is located on a bottom side 1410 of the combustor 1400. The fuel injection port 1404 is located to the right of the air injection port 1406 along a central axis of the combustor 1400, and the exit port 1408 is located on the top, right side 1414 of the combustor 1400.

As shown by FIG. 14, a co-flow configuration with a high velocity air jet near the combustor walls is created within the combustion chamber 1402 as the fuel enters the combustion chamber 1402 from the fuel injection port 1404 located on the bottom side 1410 of the combustor 1400 and the heated air enters the combustion chamber 1402 from the air injection port 1406 also located on the bottom side 1410 of the combustor 1400. A vertical uniform thermal field is created within the center of the combustion chamber 1402. The combustion byproducts exit the combustion chamber 1402 via the exit port 1408. Ignition occurs along an axis of the air injection port 1406 and colorless distributed combustion occurs mainly throughout the combustion chamber 1402.

Figure 15:
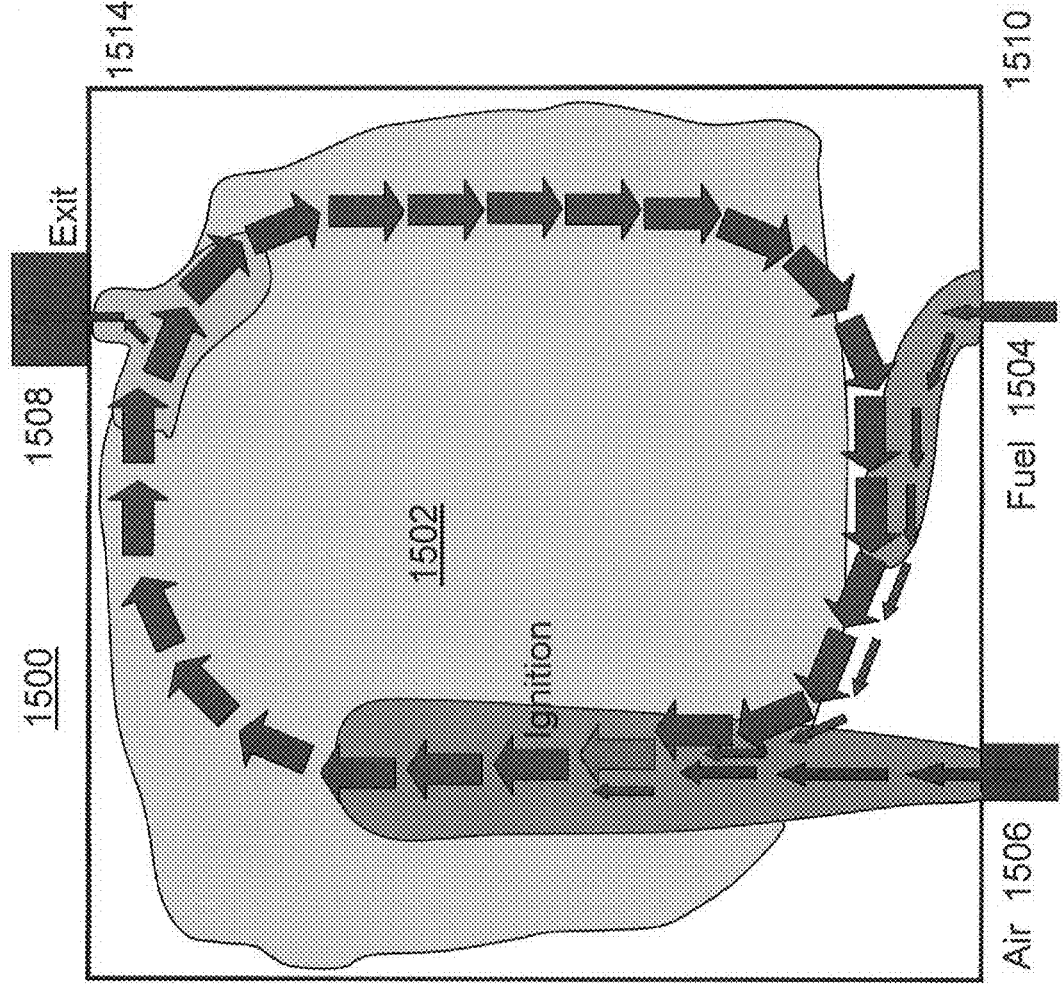

FIG. 15 illustrates a rectangular gas turbine CDC combustor 1500 having a combustion chamber 1502, a fuel injection port 1504 in fluid communication with the combustion chamber, an air injection port 1506 in fluid communication with the combustion chamber, and an exit port 1508 in fluid communication with the combustion chamber. The air injection port 1506 is located on a bottom side 1510 of the combustor 1500. The fuel injection port 1504 is located to the right of the air injection port 1506, and the exit port 1508 is located on the top, right side 1514 of the combustor 1500.

As shown by FIG. 15, a co-flow configuration is created within the combustion chamber 1502 as the fuel enters the combustion chamber 1502 from the fuel injection port 1504 located on the bottom side 1510 of the combustor 1500 and the heated air enters the combustion chamber 1502 from the air injection port 1506 also located on the bottom side 1510 of the combustor 1500. A vertical uniform thermal field is created within the combustion chamber 1502. The combustion byproducts exit the combustion chamber 1502 via the exit port 1508. Ignition occurs along the central axis of the combustor 1500 and colorless distributed combustion occurs mainly throughout the combustion chamber 1502.

Figure 16:
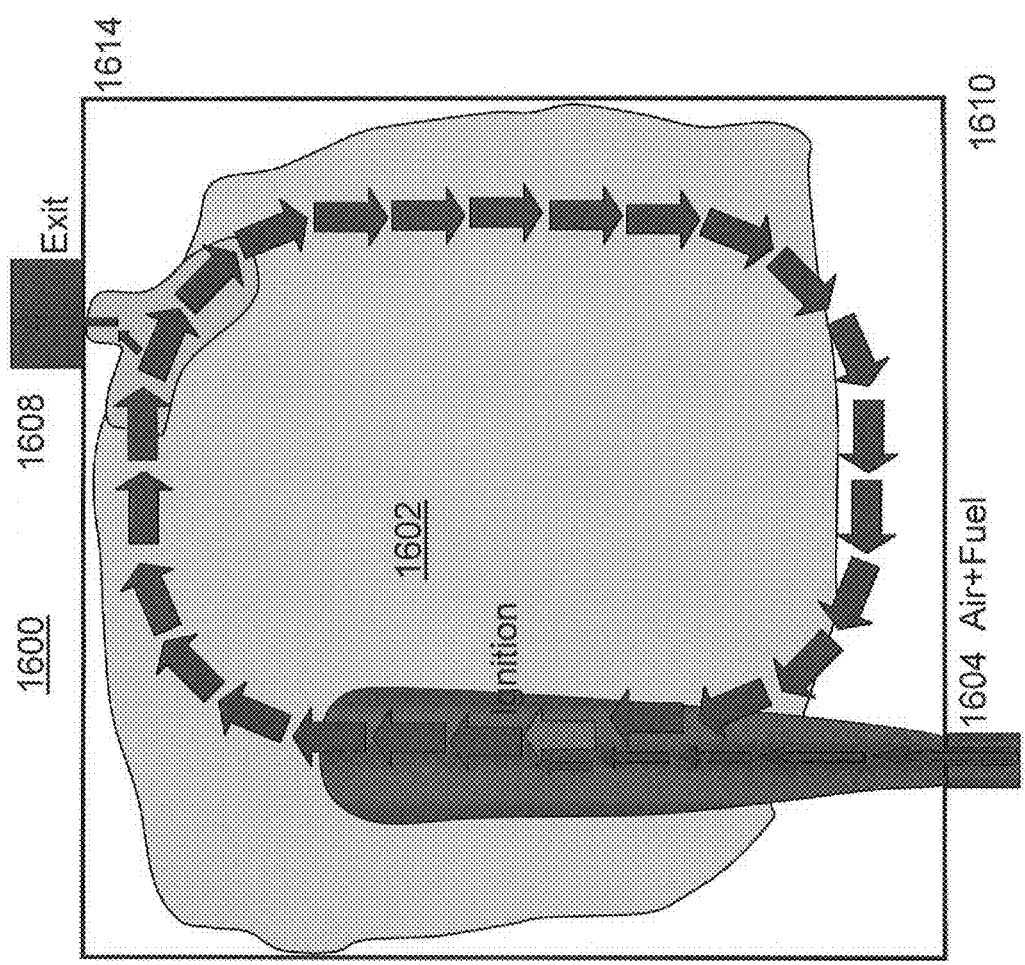

FIG. 16 illustrates a rectangular gas turbine CDC combustor 1600 having a combustion chamber 1602, a fuel/air injection port 1604 in fluid communication with the combustion chamber, and an exit port 1608 in fluid communication with the combustion chamber. The fuel/air injection port 1604 is located on a bottom side 1610 of the combustor 1600 and displaced from the central axis. The exit port 1608 is located on the top, right side 1614 of the combustor 1600.

As shown by FIG. 16, a co-annular flow configuration is created within the combustion chamber 1602 as the fuel/air which is premixed enters the combustion chamber 1602 from the fuel/air injection port 1604 located on the bottom side 1610 of the combustor 1600. A vertical uniform thermal field is created within the combustion chamber 1602. The combustion byproducts exit the combustion chamber 1602 via the exit port 1608. Ignition occurs along an axis of the fuel/air injection port 1604 and colorless distributed combustion occurs mainly throughout the combustion chamber 1602.

Figure 17:
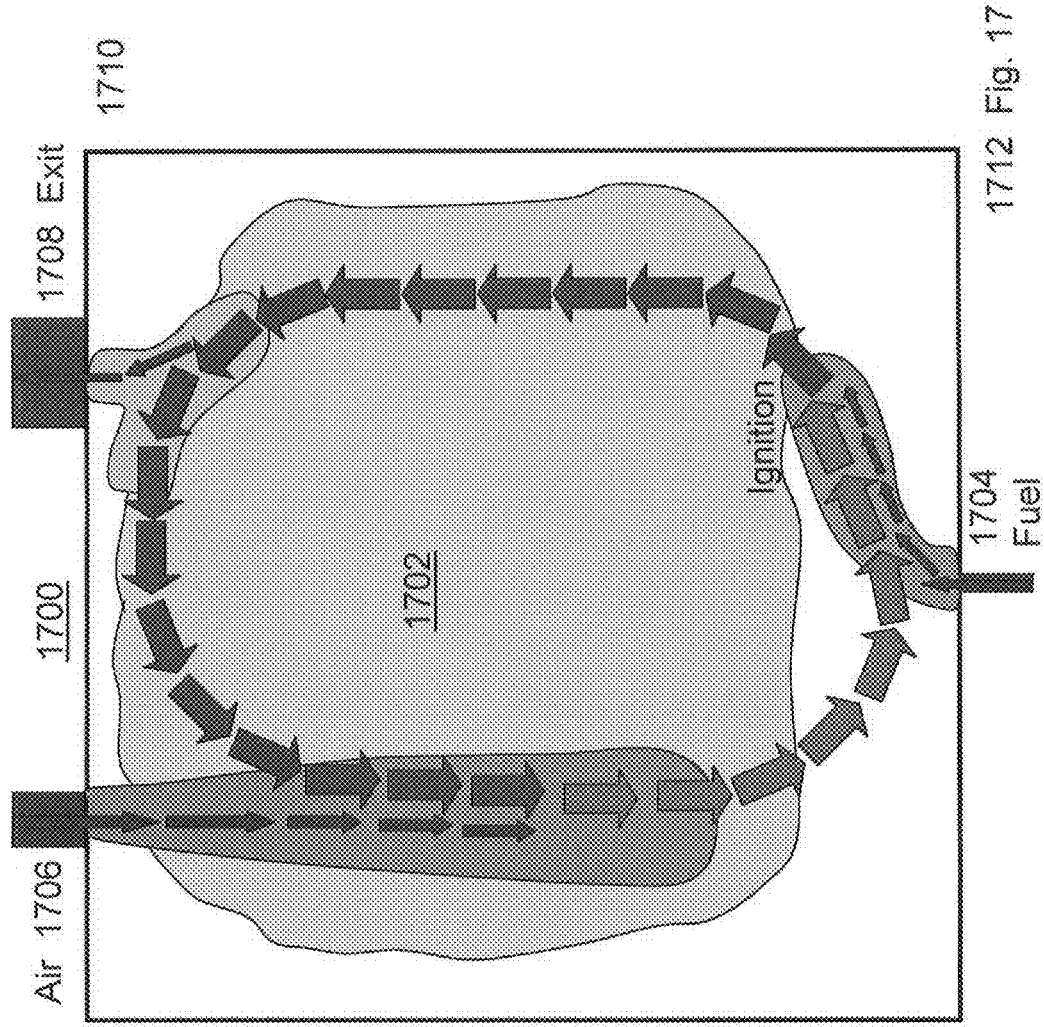

FIG. 17 illustrates a rectangular gas turbine CDC combustor 1700 having a combustion chamber 1702, a fuel injection port 1704 in fluid communication with the combustion chamber, an air injection port 1706 in fluid communication with the combustion chamber, and an exit port 1708 in fluid communication with the combustion chamber. The air injection port 1706 is located on a top side 1710 of the combustor 1700. The fuel injection port 1704 is located on a bottom side 1712 of the combustor 1700 along a central axis of the combustor 1700, and the exit port 1708 is located on the top, right side 1714 of the combustor 1700.

As shown by FIG. 17, an opposed flow configuration is created within the combustion chamber 1702 as the fuel enters the combustion chamber 1702 from the fuel injection port 1704 located on the bottom side 1712 and the heated air enters the combustion chamber 1702 from the air injection port 1706 located on the top side 1710 of the combustor 1700. A vertical uniform thermal field is created within the combustion chamber 1702. The combustion byproducts exit the combustion chamber 1702 via the exit port 1708. Ignition occurs in proximity to the fuel injection port 1704 and colorless distributed combustion occurs mainly throughout the combustion chamber 1702.

Figure 18:
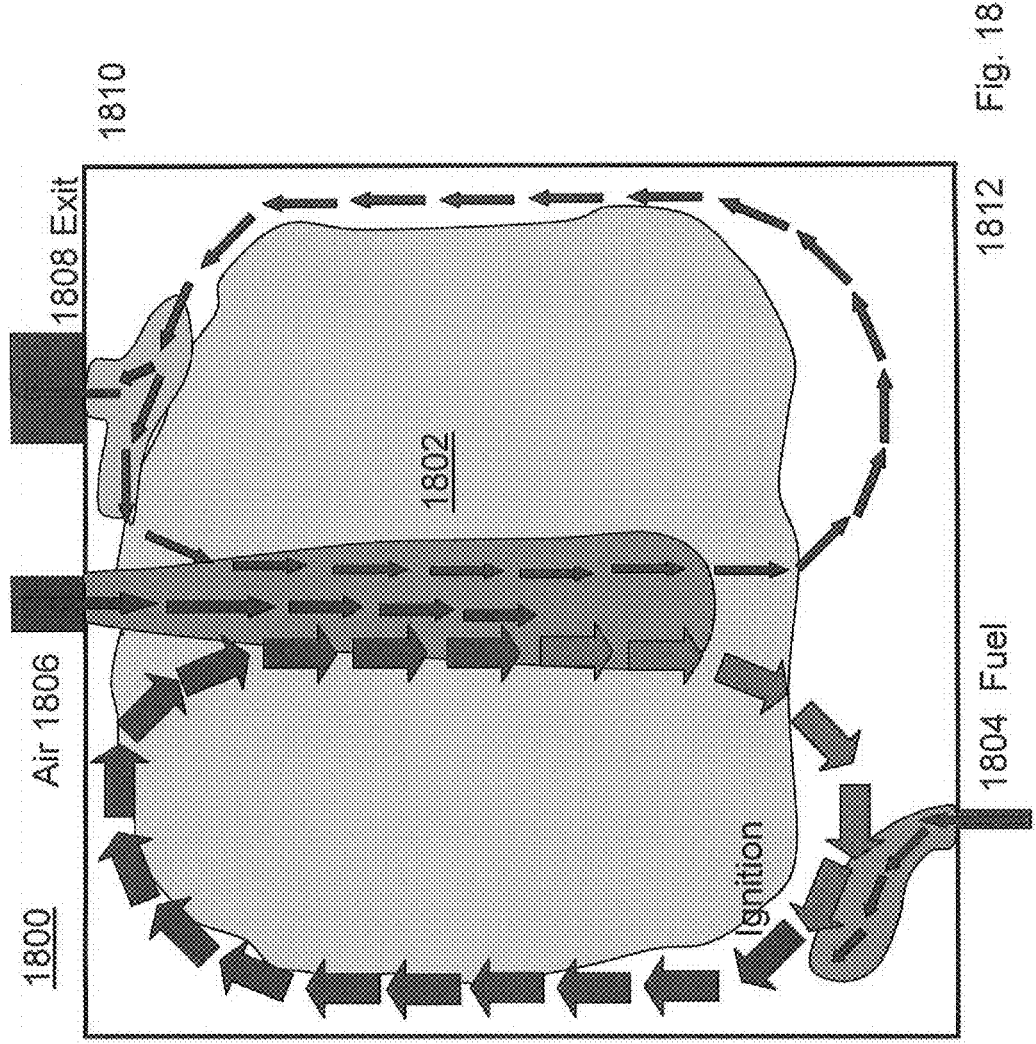

FIG. 18 illustrates a rectangular gas turbine CDC combustor 1800 having a combustion chamber 1802, a fuel injection port 1804 in fluid communication with the combustion chamber, an air injection port 1806 in fluid communication with the combustion chamber, and an exit port 1808 in fluid communication with the combustion chamber. The air injection port 1806 is located on a top side 1810 of the combustor 1800 along a central axis thereof. The fuel injection port 1804 is located on a bottom side 1812 of the combustor 1800, and the exit port 1808 is located on the top, right side 1814 of the combustor 1800.

As shown by FIG. 18, an opposed flow configuration is created within the combustion chamber 1802 with the fuel injected towards the combustor wall, as the fuel enters the combustion chamber 1802 from the fuel injection port 1804 located on the bottom side 1812 and the heated air enters the combustion chamber 1802 from the air injection port 1806 located on the top side 1810 of the combustor 1800. A vertical uniform thermal field is created within the combustion chamber 1802. The combustion byproducts exit the combustion chamber 1802 via the exit port 1808. Ignition occurs in proximity to the fuel injection port 1804 and colorless distributed combustion occurs mainly throughout the combustion chamber 1802.

Figure 19:
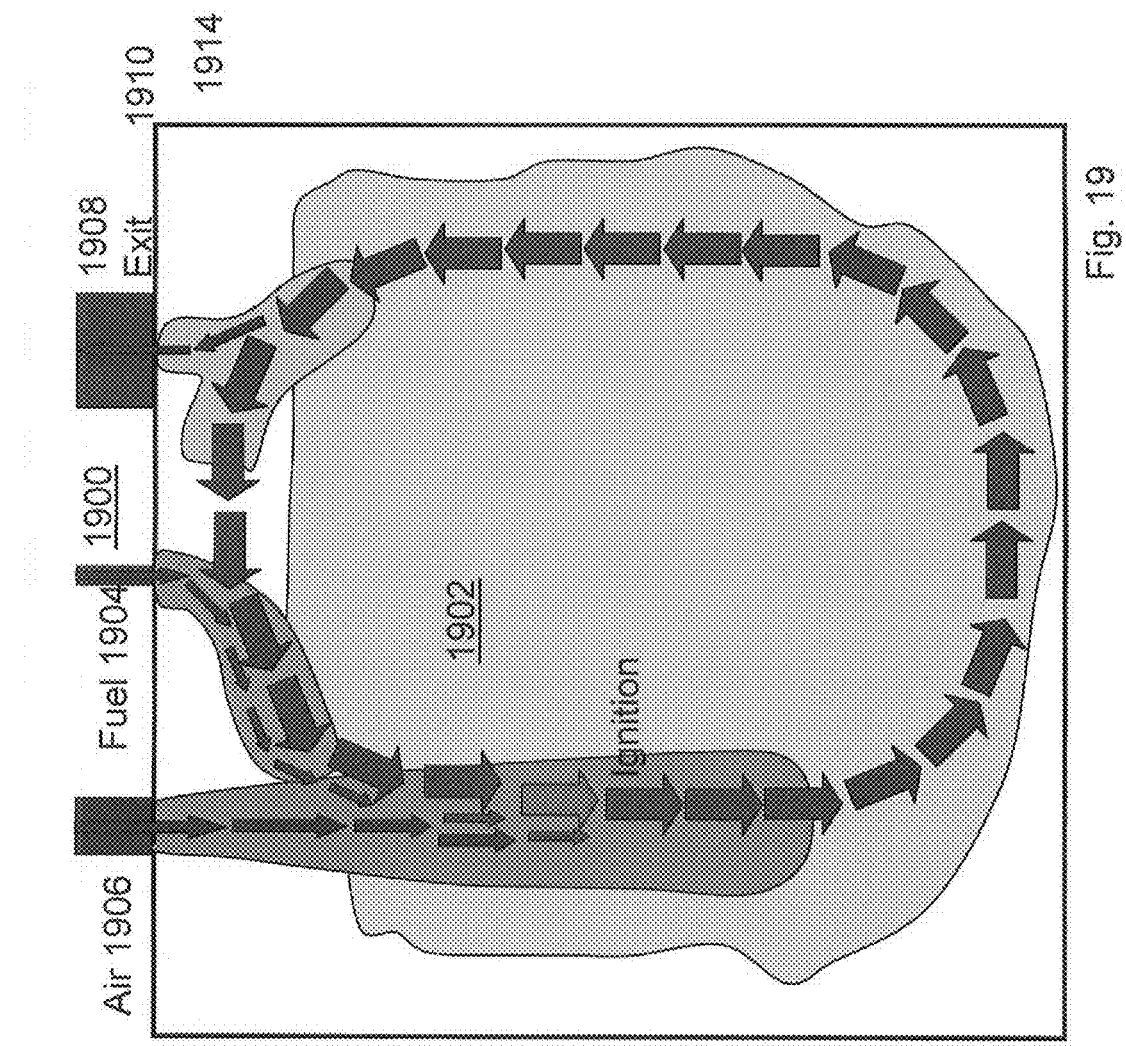

FIG. 19 illustrates a rectangular gas turbine CDC combustor 1900 having a combustion chamber 1902, a fuel injection port 1904 in fluid communication with the combustion chamber, an air injection port 1906 in fluid communication with the combustion chamber, and an exit port 1908 in fluid communication with the combustion chamber. The air injection port 1906 is located on a top side 1910 of the combustor 1900. The fuel injection port 1904 is also located on the top side 1910 of the combustor 1900 and along a central axis thereof. The exit port 1908 is located on the top, right side 1914 of the combustor 1900.

As shown by FIG. 19, a co-flow configuration is created within the combustion chamber 1902 as the heated air and fuel enter the combustion chamber 1902 from the same side of the combustor 1900. A vertical uniform thermal field is created within the combustion chamber 1902. The combustion byproducts exit the combustion chamber 1902 via the exit port 1908. Ignition occurs along an axis of the air injection port 1906 and colorless distributed combustion occurs mainly throughout the combustion chamber 1902.

Figure 20:
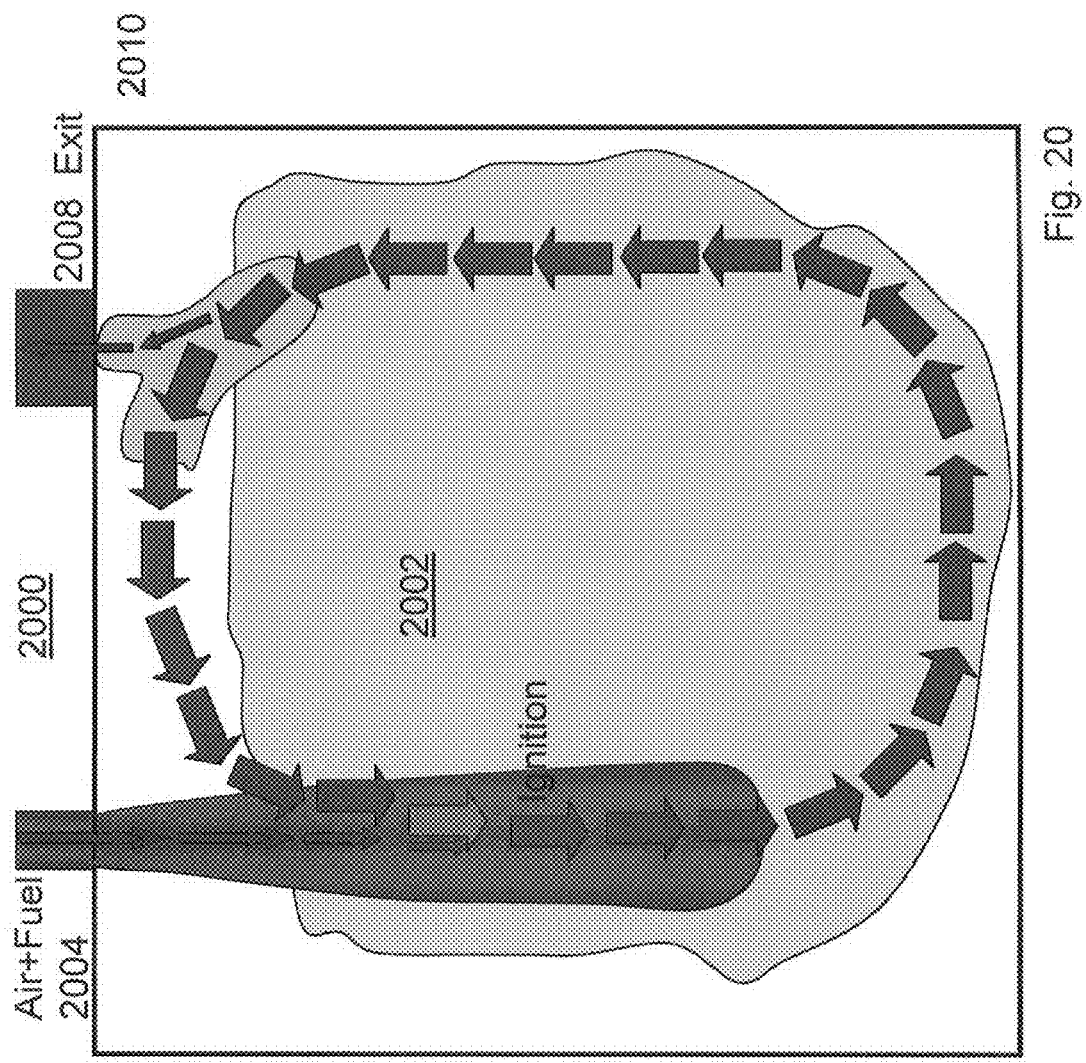

FIG. 20 illustrates a rectangular gas turbine CDC combustor 2000 having a combustion chamber 2002, a fuel/air injection port 2004 in fluid communication with the combustion chamber, and an exit port 2008 in fluid communication with the combustion chamber. The fuel/air injection port 2004 is located on a top side 2010 of the combustor 2000 and displaced from the central axis. The exit port 2008 is located on the top, right side 2014 of the combustor 2000.

As shown by FIG. 20, a co-annular flow configuration is created within the combustion chamber 2002 as the fuel/air which is premixed enters the combustion chamber 2002 from the fuel/air injection port 2004 located on the top side 2010 of the combustor 2000. A vertical uniform thermal field is created within the combustion chamber 2002. The combustion byproducts exit the combustion chamber 2002 via the exit port 2008. Ignition occurs along an axis of the fuel/air injection port 2004 and colorless distributed combustion occurs mainly throughout the combustion chamber 2002.

Figure 21:
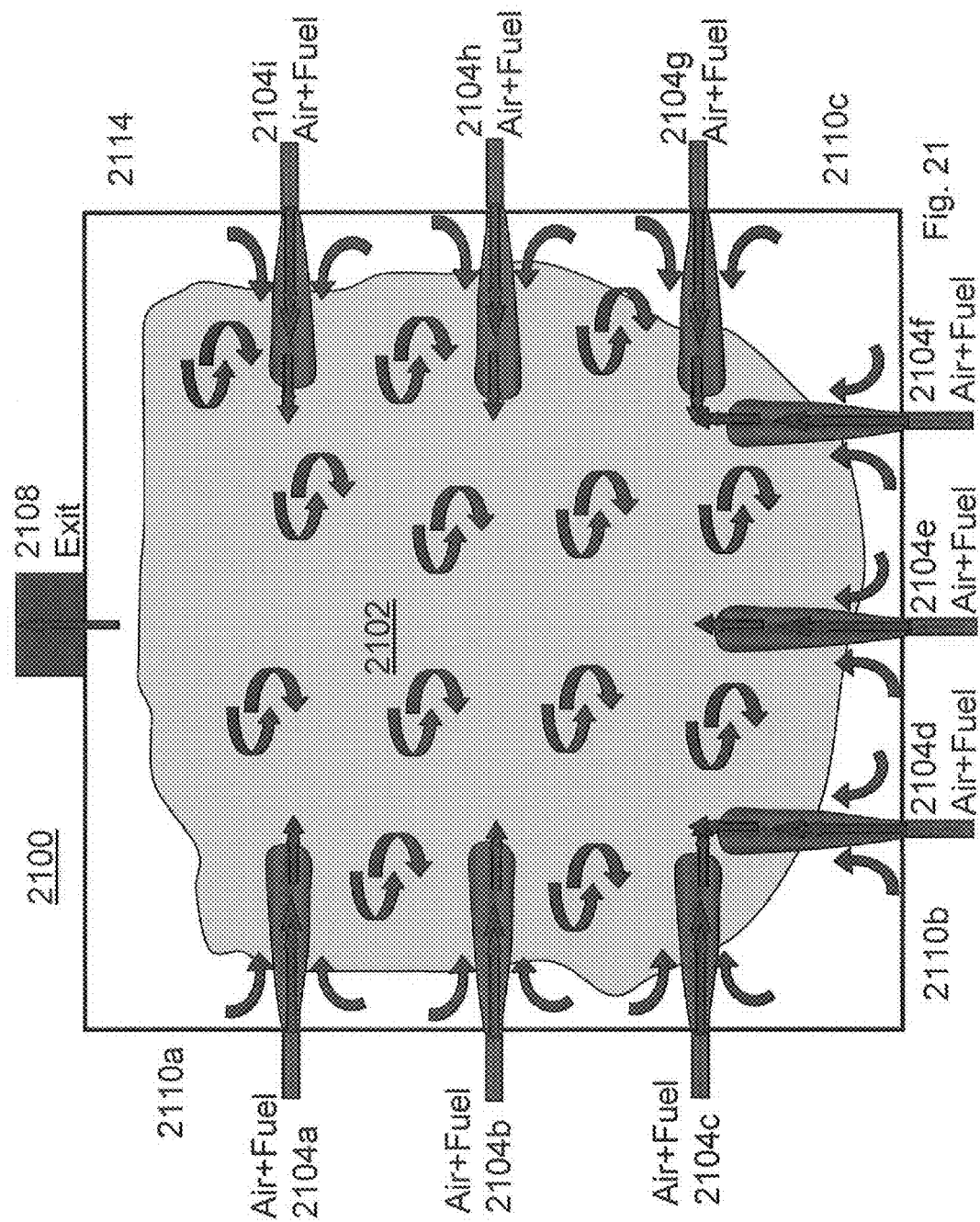

FIG. 21 illustrates a rectangular gas turbine CDC combustor 2100 having a combustion chamber 2102, multiple fuel/air injection ports 2104a-i, and an exit port 2108 in fluid communication with the combustion chamber. The fuel/air injection ports 2104a-i are located on three sides 2110a-c of the combustor 2100, including one along a central axis of the combustor 2100. The exit port 2108 is located on a top side 2114 of the combustor 2100 and along the central axis thereof.

As shown by FIG. 21, premixed air and fuel enter the combustion chamber 2102 from multiple sides of the combustor 2100. Multiple uniform thermal fields are created within the combustion chamber 2102. The combustion byproducts exit the combustion chamber 2102 via the exit port 2108. Ignition occurs along each axis of the fuel/air injection ports 2104a-i and colorless distributed combustion occurs mainly throughout the combustion chamber 2102.

Figure 22:
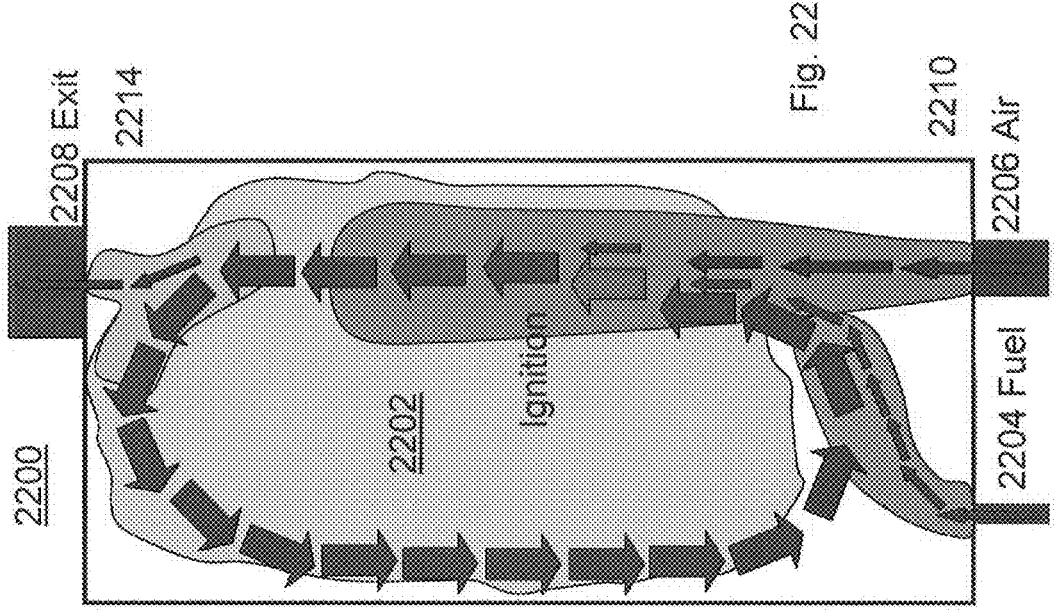

FIG. 22 illustrates a rectangular gas turbine CDC combustor 2200 having a combustion chamber 2202, a fuel injection port 2204 in fluid communication with the combustion chamber, an air injection port 2206 in fluid communication with the combustion chamber, and an exit port 2208 in fluid communication with the combustion chamber. The air injection port 2206 is located on a bottom side 2210 of the combustor 2200. The fuel injection port 2204 is also located on the bottom side 2210 of the combustor 2200. The exit port 2208 is located on the top, right side 2214 of the combustor 2200.

As shown by FIG. 22, a high intensity co-flow configuration is created within the combustion chamber 2202 as the heated air and fuel enter the combustion chamber 2202 from the same side of the combustor 2200. A vertical uniform thermal field is created within the combustion chamber 2202. The combustion byproducts exit the combustion chamber 2202 via the exit port 2208. Ignition occurs along an axis of the air injection port 2206 and colorless distributed combustion occurs mainly throughout the combustion chamber 2202.

Figure 23:
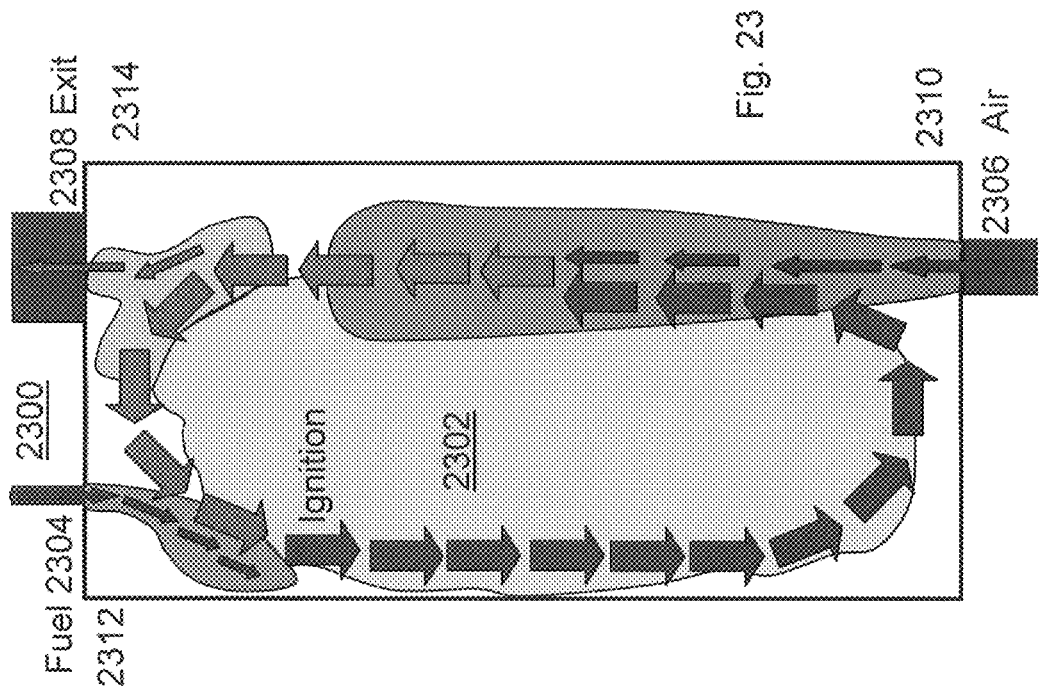

FIG. 23 illustrates a rectangular gas turbine CDC combustor 2300 having a combustion chamber 2302, a fuel injection port 2304 in fluid communication with the combustion chamber, an air injection port 2306 in fluid communication with the combustion chamber, and an exit port 2308 in fluid communication with the combustion chamber. The air injection port 2306 is located on a bottom side 2310 of the combustor 2300. The fuel injection port 2304 is located on a top side 2312 of the combustor 2300, and the exit port 2308 is located on the top, right side 2314 of the combustor 2300.

As shown by FIG. 23, a high intensity compact opposed flow configuration is created within the combustion chamber 2302 as the fuel enters the combustion chamber 2302 from the fuel injection port 2304 located on the top side 2312 and the heated air enters the combustion chamber 2302 from the air injection port 2306 located on the bottom side 2310 of the combustor 2300. A vertical uniform thermal field is created within the combustion chamber 2302. The combustion byproducts exit the combustion chamber 2302 via the exit port 2308. Ignition occurs in proximity to the fuel injection port 2304 and colorless distributed combustion occurs mainly throughout the combustion chamber 2302.

Figure 24:
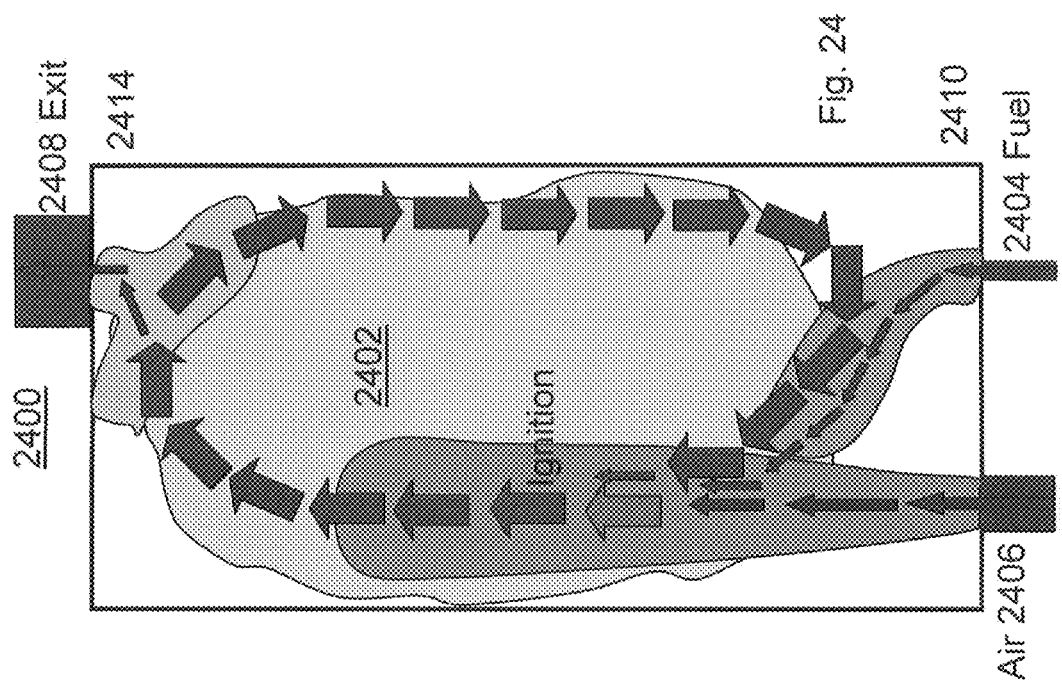

FIG. 24 illustrates a rectangular gas turbine CDC combustor 2400 having a combustion chamber 2402, a fuel injection port 2404 in fluid communication with the combustion chamber, an air injection port 2406 in fluid communication with the combustion chamber, and an exit port 2408 in fluid communication with the combustion chamber. The air injection port 2406 is located on a bottom side 2410 of the combustor 1400. The fuel injection port 2404 is also located on the bottom side 2410 of the combustor 2400, and the exit port 2408 is located on the top, right side 2414 of the combustor 2400.

As shown by FIG. 24, a high intensity compact co-flow configuration is created within the combustion chamber 2402 as the fuel enters the combustion chamber 2402 from the fuel injection port 2404 located on the bottom side 2410 of the combustor 2200 and the heated air enters the combustion chamber 2402 from the air injection port 2406 also located on the bottom side 2410 of the combustor 2400. A vertical uniform thermal field is created within the center of the combustion chamber 2402. The combustion byproducts exit the combustion chamber 2402 via the exit port 2408. Ignition occurs along an axis of the air injection port 2406 and colorless distributed combustion occurs mainly throughout the combustion chamber 2402.

Figure 25:
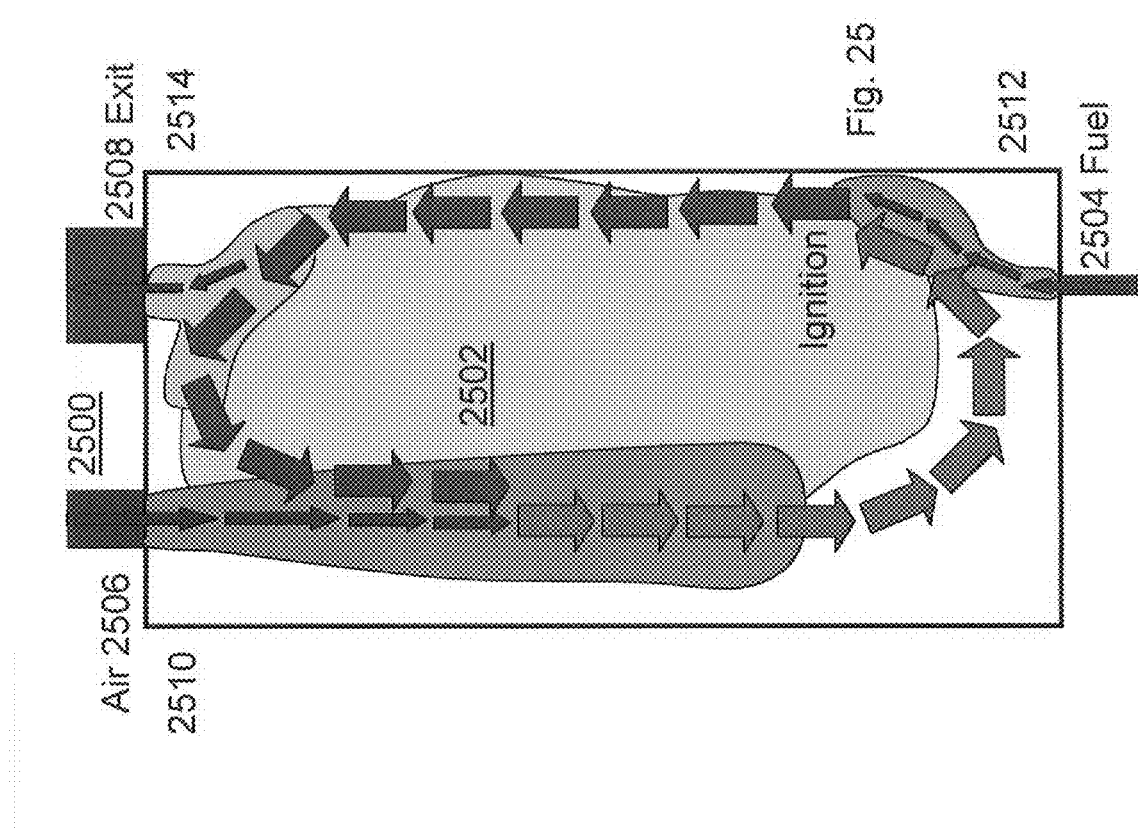

FIG. 25 illustrates a rectangular gas turbine CDC combustor 2500 having a combustion chamber 2502, a fuel injection port 2504 in fluid communication with the combustion chamber, an air injection port 2506 in fluid communication with the combustion chamber, and an exit port 2508 in fluid communication with the combustion chamber. The air injection port 2506 is located on a top side 2510 of the combustor 2500. The fuel injection port 2504 is located on a bottom side 2512 of the combustor 2500, and the exit port 2508 is located on the top, right side 2514 of the combustor 2500.

As shown by FIG. 25, a high intensity compact opposed flow configuration is created within the combustion chamber 2502 as the fuel enters the combustion chamber 2502 from the fuel injection port 2504 located on the bottom side 2512 and the heated air enters the combustion chamber 2502 from the air injection port 2506 located on the top side 2510 of the combustor 2500. A vertical uniform thermal field is created within the combustion chamber 2502. The combustion byproducts exit the combustion chamber 2502 via the exit port 2508. Ignition occurs in proximity to the fuel injection port 2504 and colorless distributed combustion occurs mainly throughout the combustion chamber 2502.

FIGS. 26-45 are cross-sectional views of cylindrical gas turbine CDC combustors having a housing defining a cylindrical combustion chamber, at least one air injection port and at least one fuel injection port, or at least one fuel/air injection port, and an exit port. Each port is in fluid communication with the combustion chamber. It is contemplated that the housing can also be elliptical or stadium shaped.

Figure 26:
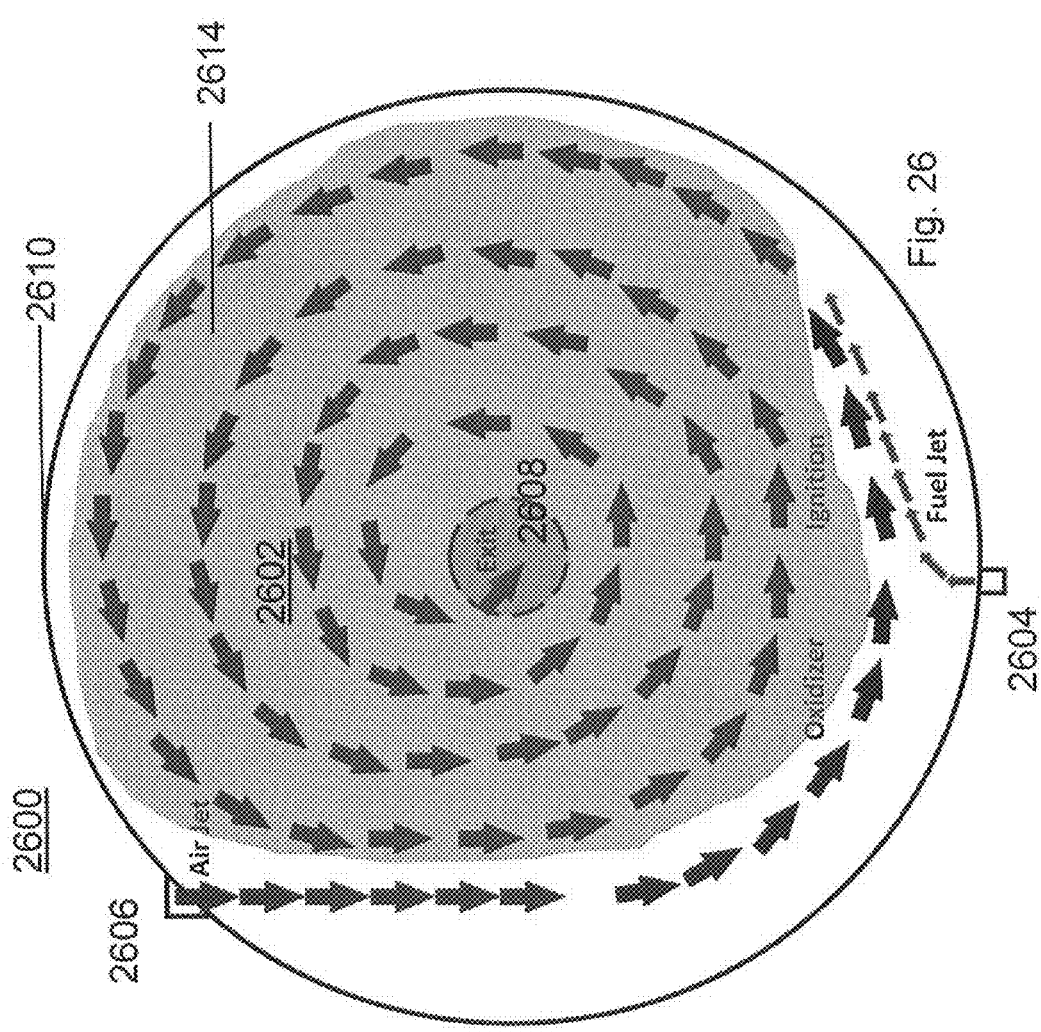

FIG. 26 illustrates a cylindrical gas turbine CDC combustor 2600 having a cylindrical combustion chamber 2602, a fuel injection port 2604 in fluid communication with the combustion chamber, an air injection port 2606 in fluid communication with the combustion chamber, and an exit port 2608 in fluid communication with the combustion chamber. The air injection port 2606 is located on an outer circular surface 2610 of the combustor 2600. The fuel injection port 2604 is also located on the outer circular surface 2610 of the combustor 2600, and the exit port 2608 is located on a top lateral side 2614 of the combustor 2600 along a longitudinal, central axis of the combustor 2600.

As shown by FIG. 26, the heated air is injected tangentially with respect to the outer circular surface 2610 and the fuel is injected radially into the cylindrical combustion chamber 2602. A vertical uniform thermal field is created within the combustion chamber 2602. The combustion byproducts exit the combustion chamber 2602 via the exit port 2608. Ignition occurs in proximity to the fuel injection port 2604 and colorless distributed combustion occurs mainly throughout the combustion chamber 2602.

Figure 27:
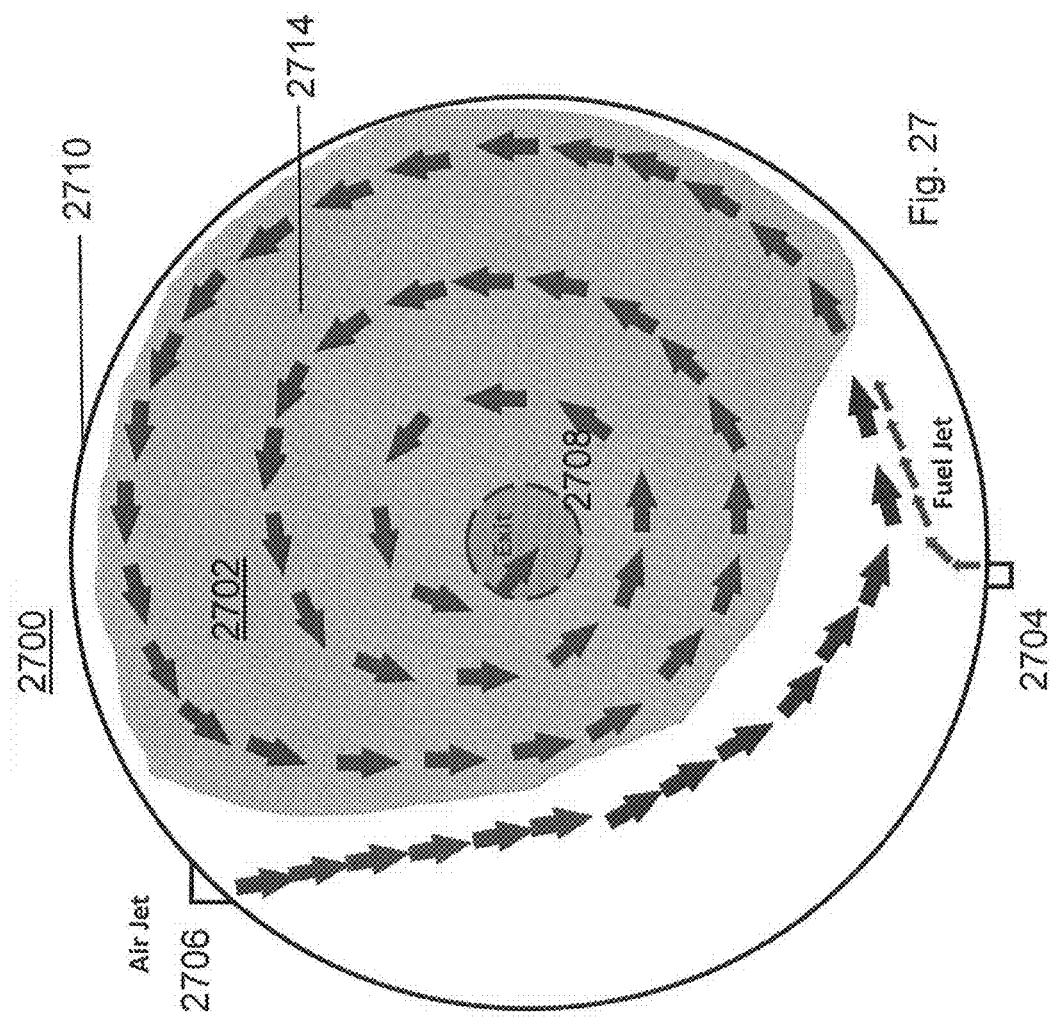

FIG. 27 illustrates a cylindrical gas turbine CDC combustor 2700 having a cylindrical combustion chamber 2702, a fuel injection port 2704 in fluid communication with the combustion chamber, an air injection port 2706 in fluid communication with the combustion chamber, and an exit port 2708 in fluid communication with the combustion chamber. The air injection port 2706 is located on an outer circular surface 2710 of the combustor 2700. The fuel injection port 2704 is also located on the outer circular surface 2710 of the combustor 2700, and the exit port 2708 is located on a top lateral side 2714 of the combustor 2700 along a longitudinal, central axis of the combustor 2700.

As shown by FIG. 27, the heated air is injected at an angle with respect to the outer circular surface 2710 and the fuel is injected radially into the cylindrical combustion chamber 2702. A vertical uniform thermal field is created within the combustion chamber 2702. The combustion byproducts exit the combustion chamber 2702 via the exit port 2708. Ignition occurs in proximity to the fuel injection port 2704 and colorless distributed combustion occurs mainly on one side of the combustion chamber 2702.

Figure 28:
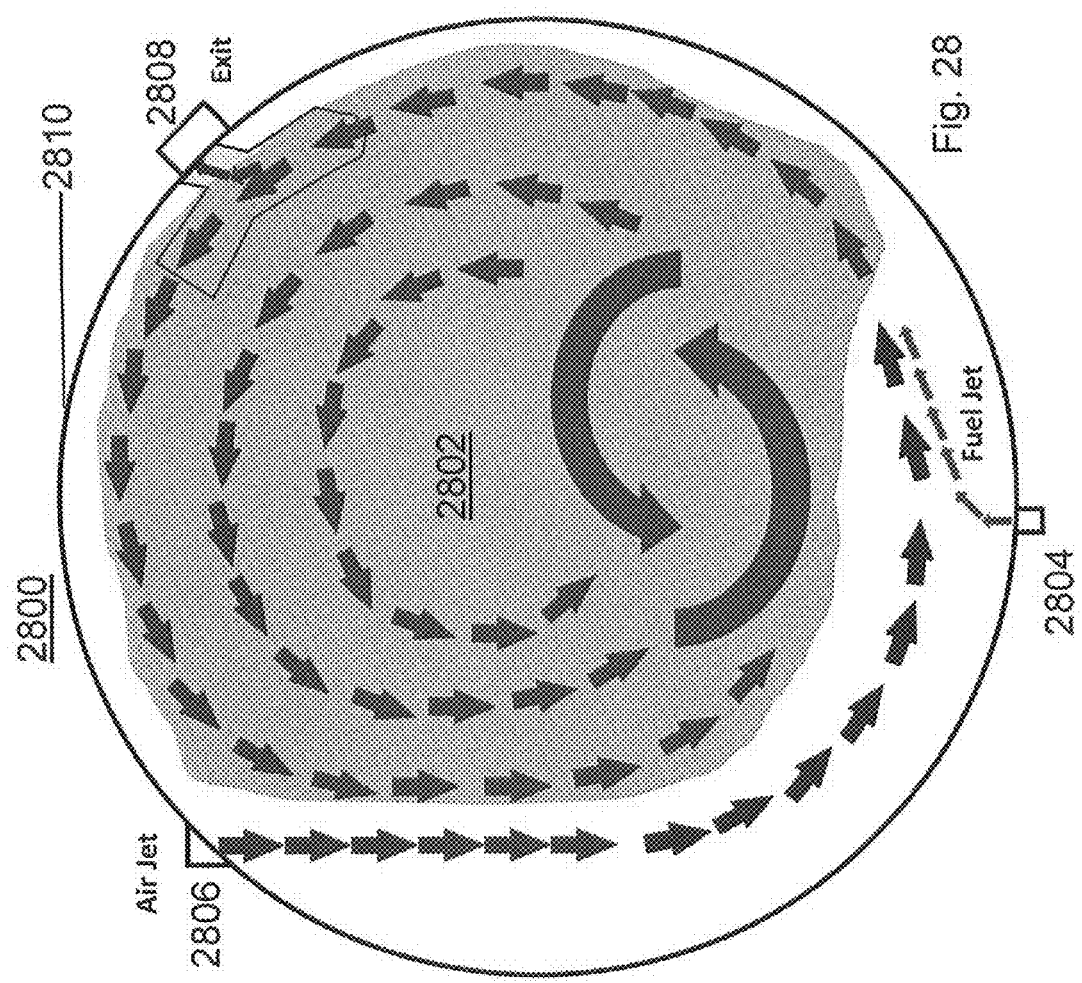

FIG. 28 illustrates a cylindrical gas turbine CDC combustor 2800 having a cylindrical combustion chamber 2802, a fuel injection port 2804 in fluid communication with the combustion chamber, an air injection port 2806 in fluid communication with the combustion chamber, and an exit port 2808 in fluid communication with the combustion chamber. The air injection port 2806 is located on an outer circular surface 2810 of the combustor 2800. The fuel injection port 2804 and the exit port 2808 are also located on the outer circular surface 2810 of the combustor 2800.

As shown by FIG. 28, the heated air is injected tangentially with respect to the outer circular surface 2810 and the fuel is injected radially into the cylindrical combustion chamber 2802. A vertical uniform thermal field is created within the combustion chamber 2802. The combustion byproducts exit the combustion chamber 2802 via the exit port 2808. Ignition occurs in proximity to the fuel injection port 2804 and colorless distributed combustion occurs mainly throughout the combustion chamber 2802.

Figure 29:
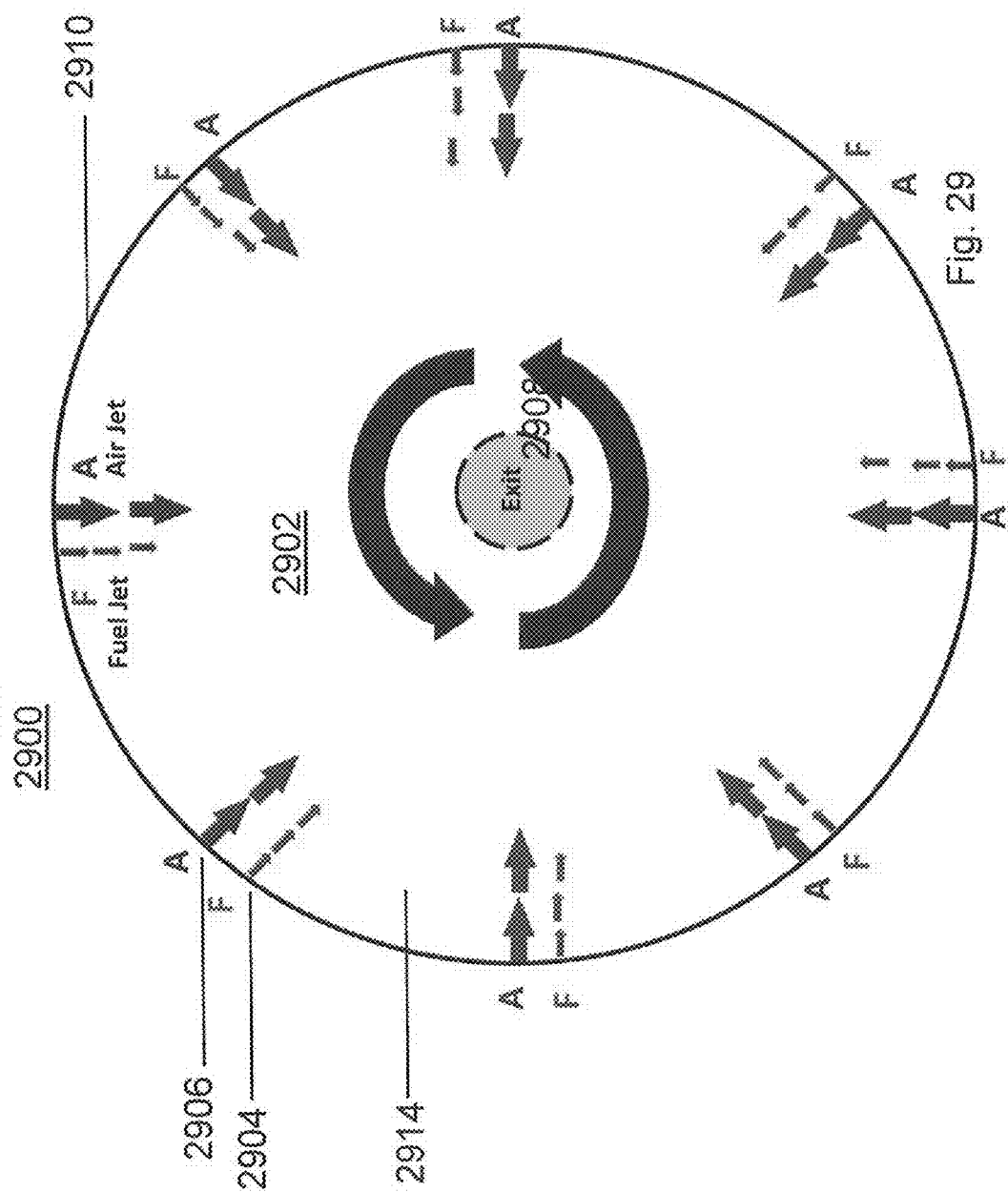

FIG. 29 illustrates a cylindrical gas turbine CDC combustor 2900 having a cylindrical combustion chamber 2902, a plurality of fuel injection ports 2904 in fluid communication with the combustion chamber, a plurality of air injection ports 2906 in fluid communication with the combustion chamber, and an exit port 2908 in fluid communication with the combustion chamber. The air injection ports 2906 are located on an outer circular surface 2910 of the combustor 2900. The fuel injection ports 2904 are also located on the outer circular surface 2910 of the combustor 2900, and the exit port 2908 is located on a top lateral side 2914 of the combustor 2900 along a longitudinal, central axis of the combustor 2900.

As shown by FIG. 29, the heated air and the fuel are injected radially towards the center of the combustion chamber 2902. A vertical uniform thermal field is created within the combustion chamber 2902. The combustion byproducts exit the combustion chamber 2902 via the exit port 2908. Ignition occurs in proximity to the fuel injection ports 2904 and colorless distributed combustion occurs mainly throughout the combustion chamber 2902.

Figure 30:
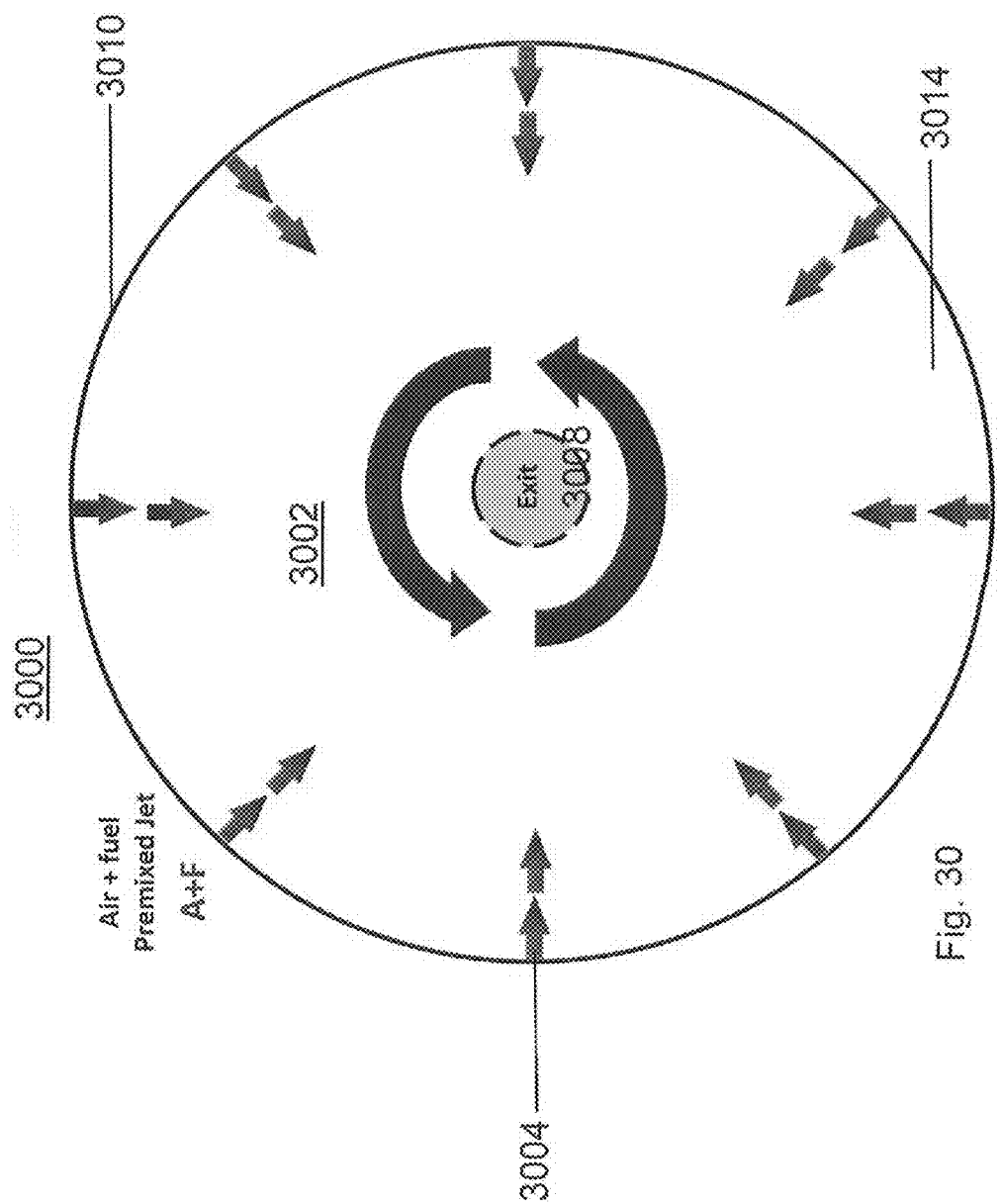

FIG. 30 illustrates a cylindrical gas turbine CDC combustor 3000 having a cylindrical combustion chamber 3002, a plurality of fuel/air injection ports 3004 in fluid communication with the combustion chamber, and an exit port 3008 in fluid communication with the combustion chamber. The fuel/air injection ports 3004 are located on an outer circular surface 3010 of the combustor 3000. The exit port 3008 is located on a top lateral side 3014 of the combustor 3000 along a longitudinal, central axis of the combustor 3000.

As shown by FIG. 30, the heated air and the fuel are premixed and injected radially towards the center of the combustion chamber 3002. A vertical uniform thermal field is created within the combustion chamber 3002. The combustion byproducts exit the combustion chamber 3002 via the exit port 3008. Ignition occurs in proximity to the fuel/air injection ports 3004 and colorless distributed combustion occurs mainly throughout the combustion chamber 3002.

Figure 31:
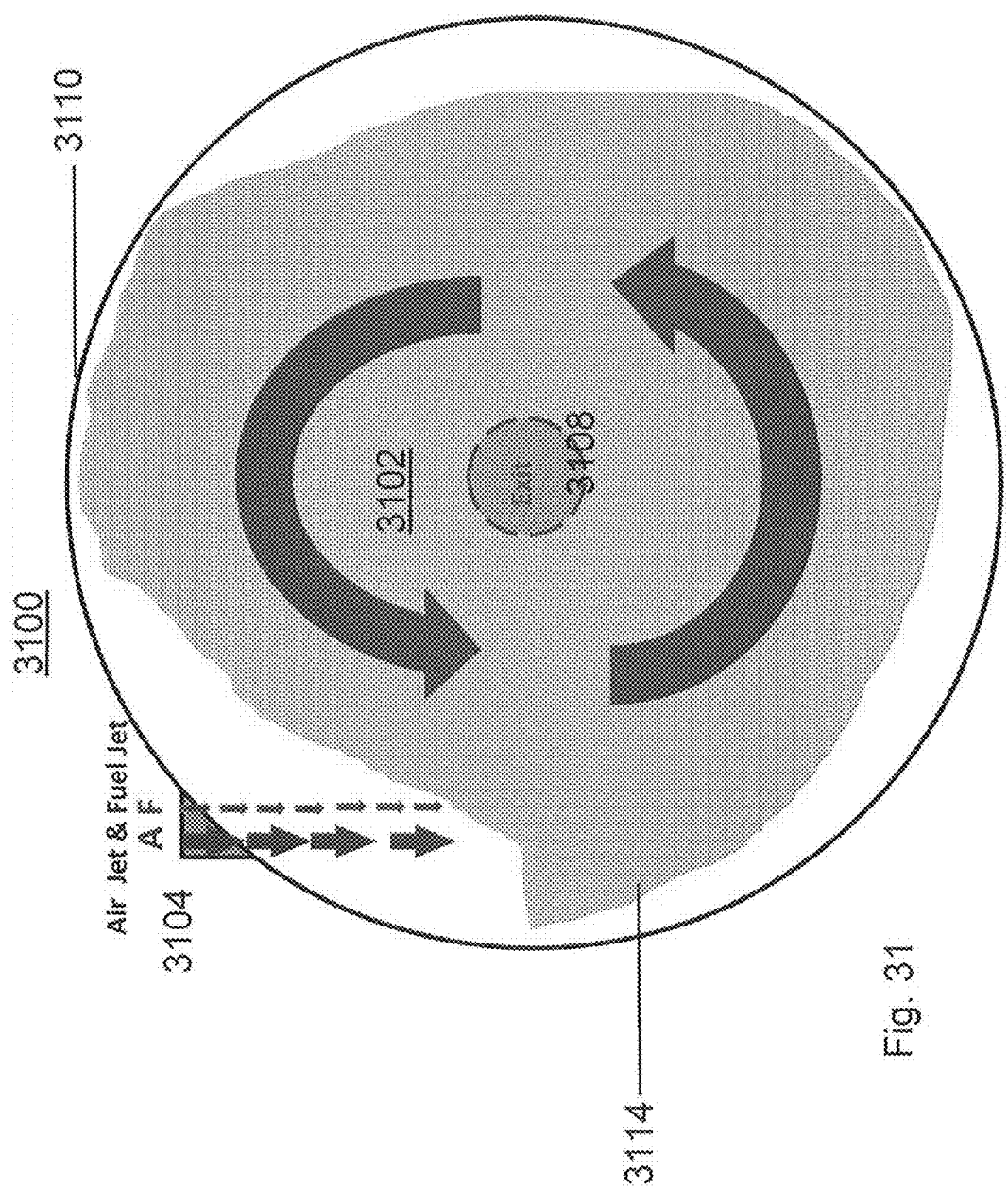

FIG. 31 illustrates a cylindrical gas turbine CDC combustor 3100 having a cylindrical combustion chamber 3102, a fuel/air injection port 3104 in fluid communication with the combustion chamber, and an exit port 3108 in fluid communication with the combustion chamber. The fuel/air injection port 3104 is located on an outer circular surface 3110 of the combustor 3100. The exit port 3108 is located on a top lateral side 3114 of the combustor 3100 along a longitudinal, central axis of the combustor 3100.

As shown by FIG. 31, the heated air and the fuel are not premixed and injected tangentially with respect to the outer circular surface 3110 of the combustion chamber 3102. The fuel is injected immediately behind the air injection. A vertical uniform thermal field is created within the combustion chamber 3102. The combustion byproducts exit the combustion chamber 3102 via the exit port 3108. Ignition occurs in proximity to the fuel/air injection port 3104 and colorless distributed combustion occurs mainly throughout the combustion chamber 3102.

Figure 32:
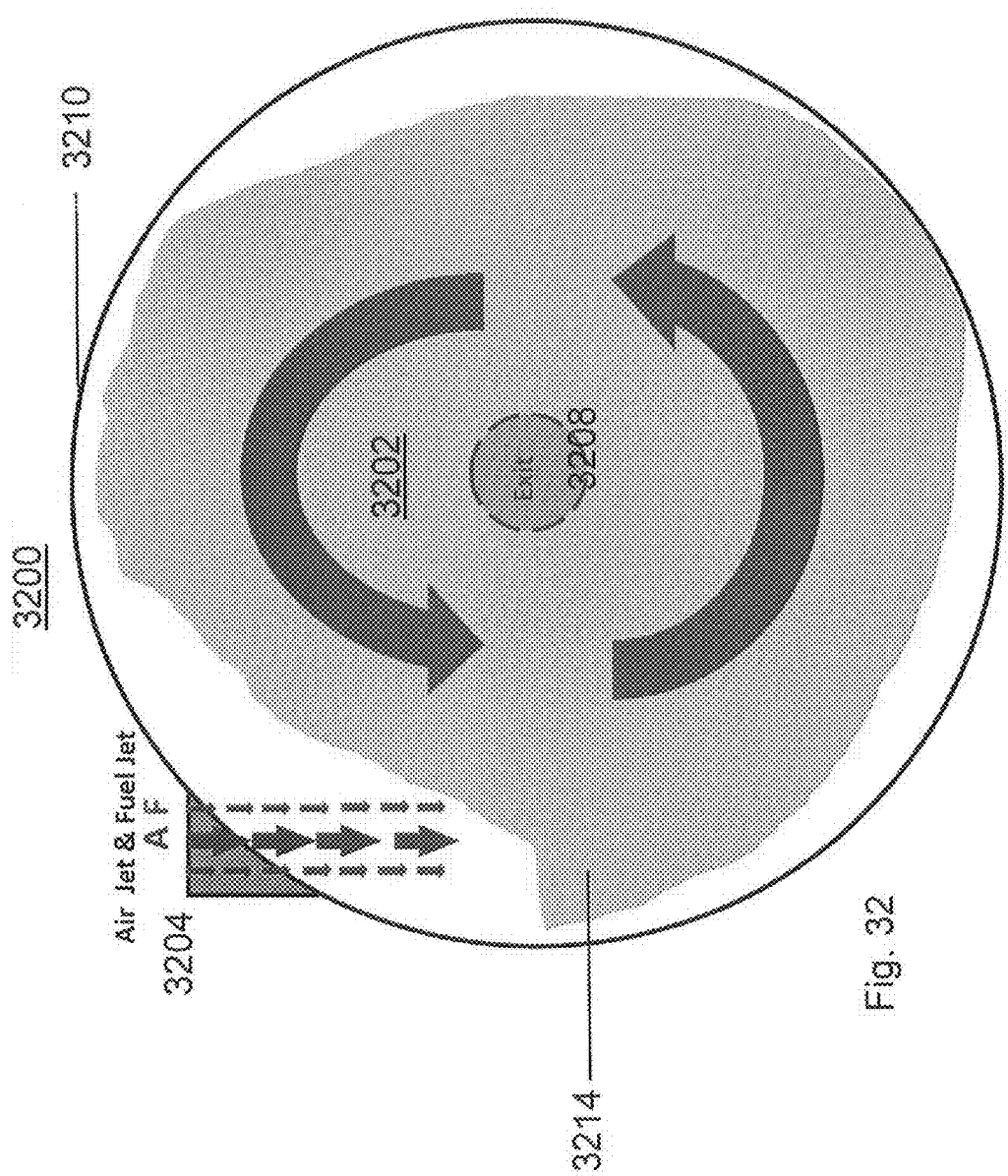

FIG. 32 illustrates a cylindrical gas turbine CDC combustor 3200 having a cylindrical combustion chamber 3202, a fuel/air injection port 3204 in fluid communication with the combustion chamber, and an exit port 3208 in fluid communication with the combustion chamber. The fuel/air injection port 3204 is located on an outer circular surface 3210 of the combustor 3200. The exit port 3208 is located on a top lateral side 3214 of the combustor 3200 along a longitudinal, central axis of the combustor 3200.

As shown by FIG. 32, the heated air and the fuel are not premixed and injected tangentially with respect to the outer circular surface 3210 of the combustion chamber 3202. The fuel is injected co-annularly with respect to the air injection. A vertical uniform thermal field is created within the combustion chamber 3202. The combustion byproducts exit the combustion chamber 3202 via the exit port 3208. Ignition occurs in proximity to the fuel/air injection port 3204 and colorless distributed combustion occurs mainly throughout the combustion chamber 3202.

Figure 33:
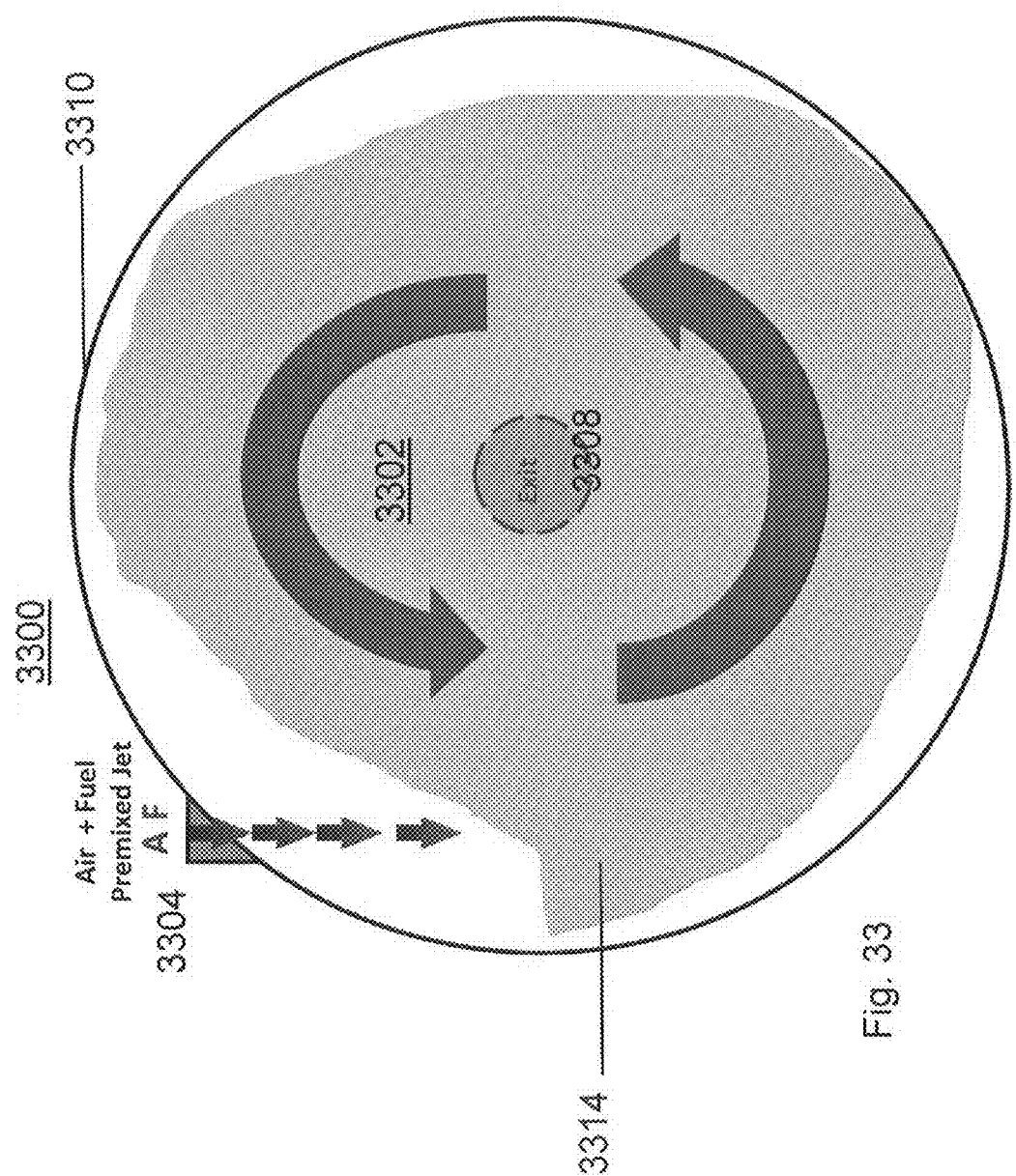

FIG. 33 illustrates a cylindrical gas turbine CDC combustor 3300 having a cylindrical combustion chamber 3302, a fuel/air injection port 3304 in fluid communication with the combustion chamber, and an exit port 3308 in fluid communication with the combustion chamber. The fuel/air injection port 3304 is located on an outer circular surface 3310 of the combustor 3300. The exit port 3308 is located on a top lateral side 3314 of the combustor 3300 along a longitudinal, central axis of the combustor 3300.

As shown by FIG. 33, the heated air and the fuel are premixed and injected tangentially with respect to the outer circular surface 3310 of the combustion chamber 3302. A vertical uniform thermal field is created within the combustion chamber 3302. The combustion byproducts exit the combustion chamber 3302 via the exit port 3308. Ignition occurs in proximity to the fuel/air injection port 3304 and colorless distributed combustion occurs mainly throughout the combustion chamber 3302.

Figure 34:
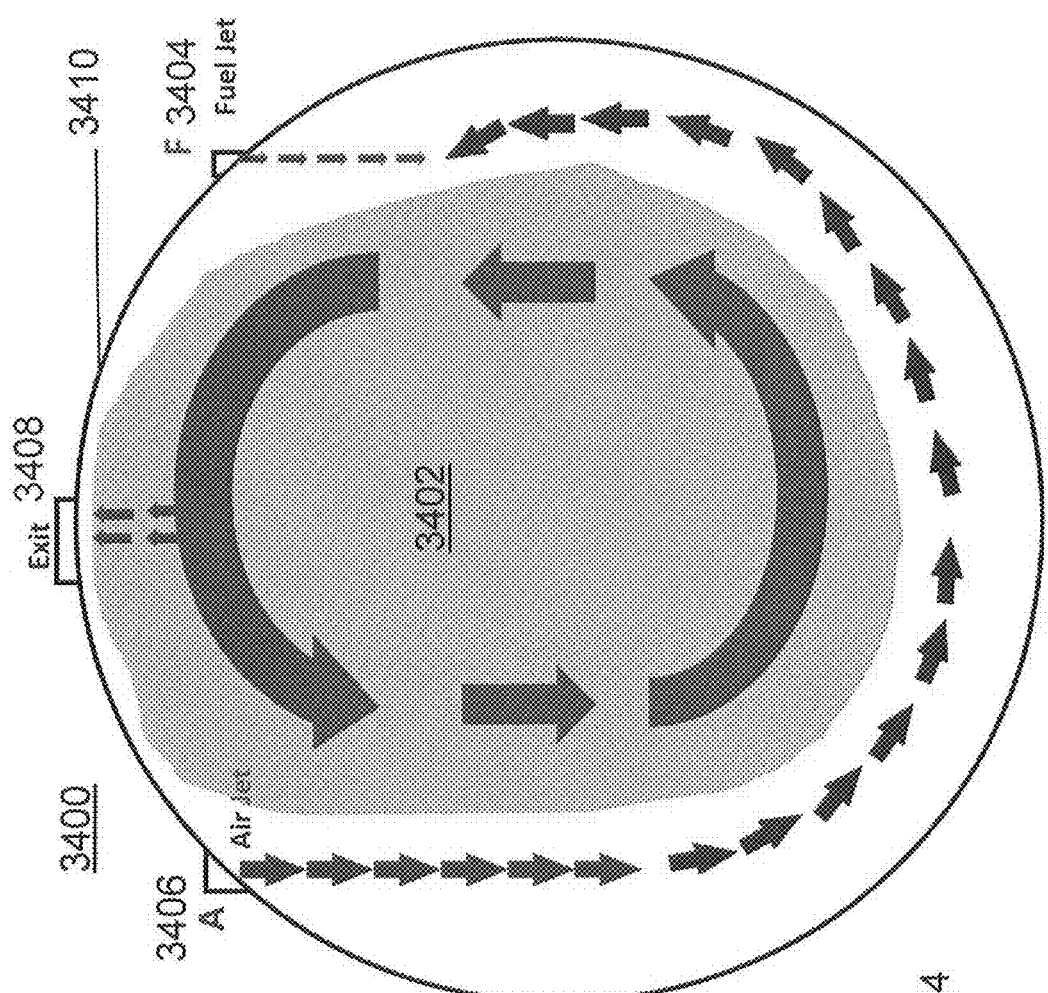

FIG. 34 illustrates a cylindrical gas turbine CDC combustor 3400 having a cylindrical combustion chamber 3402, a fuel injection port 3404 in fluid communication with the combustion chamber, an air injection port 3406 in fluid communication with the combustion chamber, and an exit port 3408 in fluid communication with the combustion chamber. The air injection port 3406 is located on an outer circular surface 3410 of the combustor 3400. The fuel injection port 3404 and the exit port 3408 are also located on the outer circular surface 3410 of the combustor 3400.

As shown by FIG. 34, the heated air and fuel are injected tangentially with respect to the outer circular surface 3410 of the cylindrical combustion chamber 3402. A vertical uniform thermal field is created within the combustion chamber 3402. The combustion byproducts exit the combustion chamber 3402 via the exit port 3408. Ignition occurs in proximity to the fuel injection port 3404 and colorless distributed combustion occurs mainly in the central region of the combustion chamber 3402.

Figure 35:
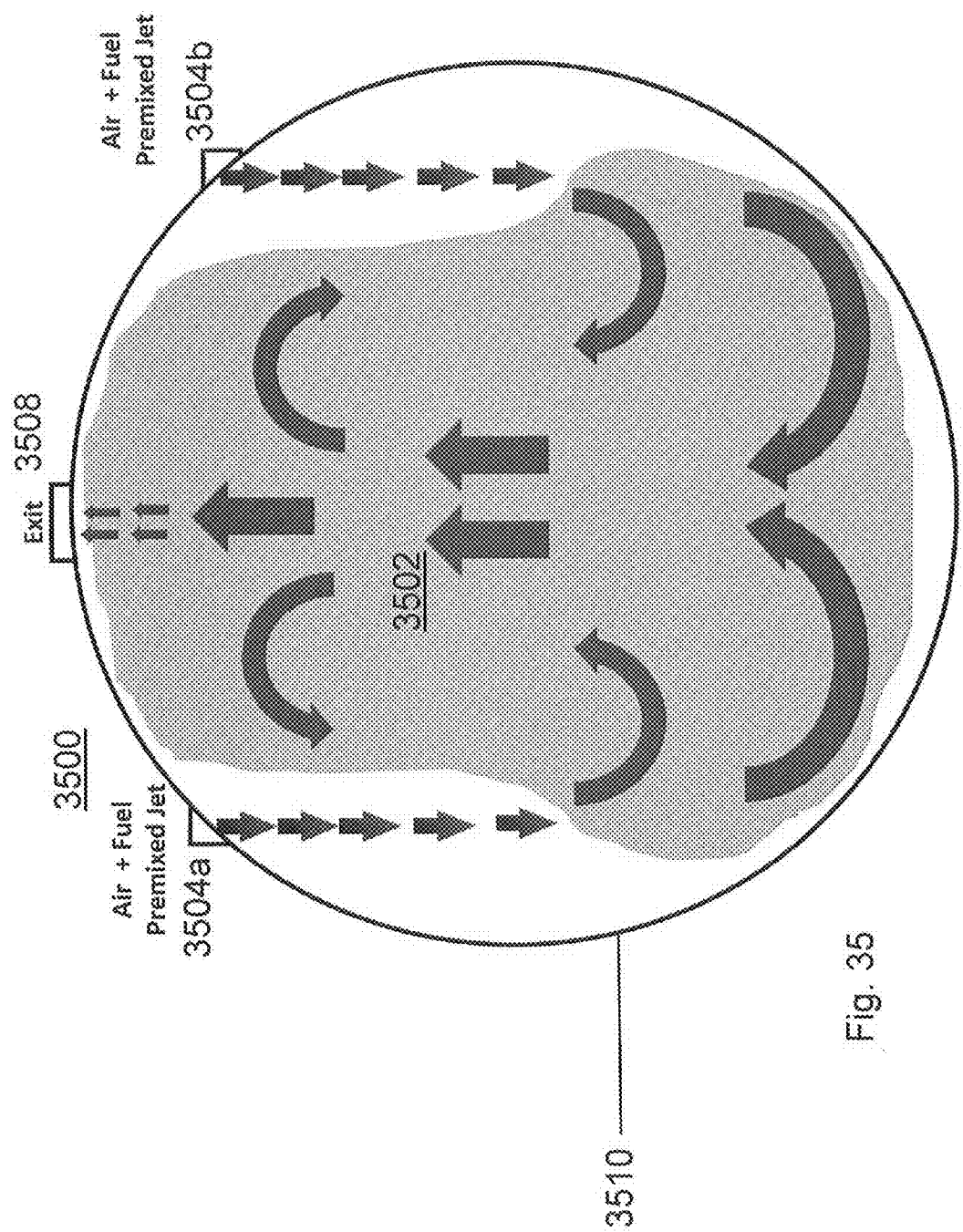

FIG. 35 illustrates a cylindrical gas turbine CDC combustor 3500 having a cylindrical combustion chamber 3502, two fuel/air injection ports 3504*a-b*, and an exit port 3508 in fluid communication with the combustion chamber. The fuel/air injection ports 3504*a-b* and the exit port 3508 are located on an outer circular surface 3510 of the combustor 3500.

As shown by FIG. 35, the heated air and fuel are premixed and injected tangentially with respect to the outer circular surface 3510 of the cylindrical combustion chamber 3502. A vertical uniform thermal field is created within the combustion chamber 3502. The combustion byproducts exit the combustion chamber 3502 via the exit port 3508. Ignition occurs in proximity to the fuel/air injection ports 3504*a-b* and colorless distributed combustion occurs mainly throughout the combustion chamber 3502.

Figure 36:
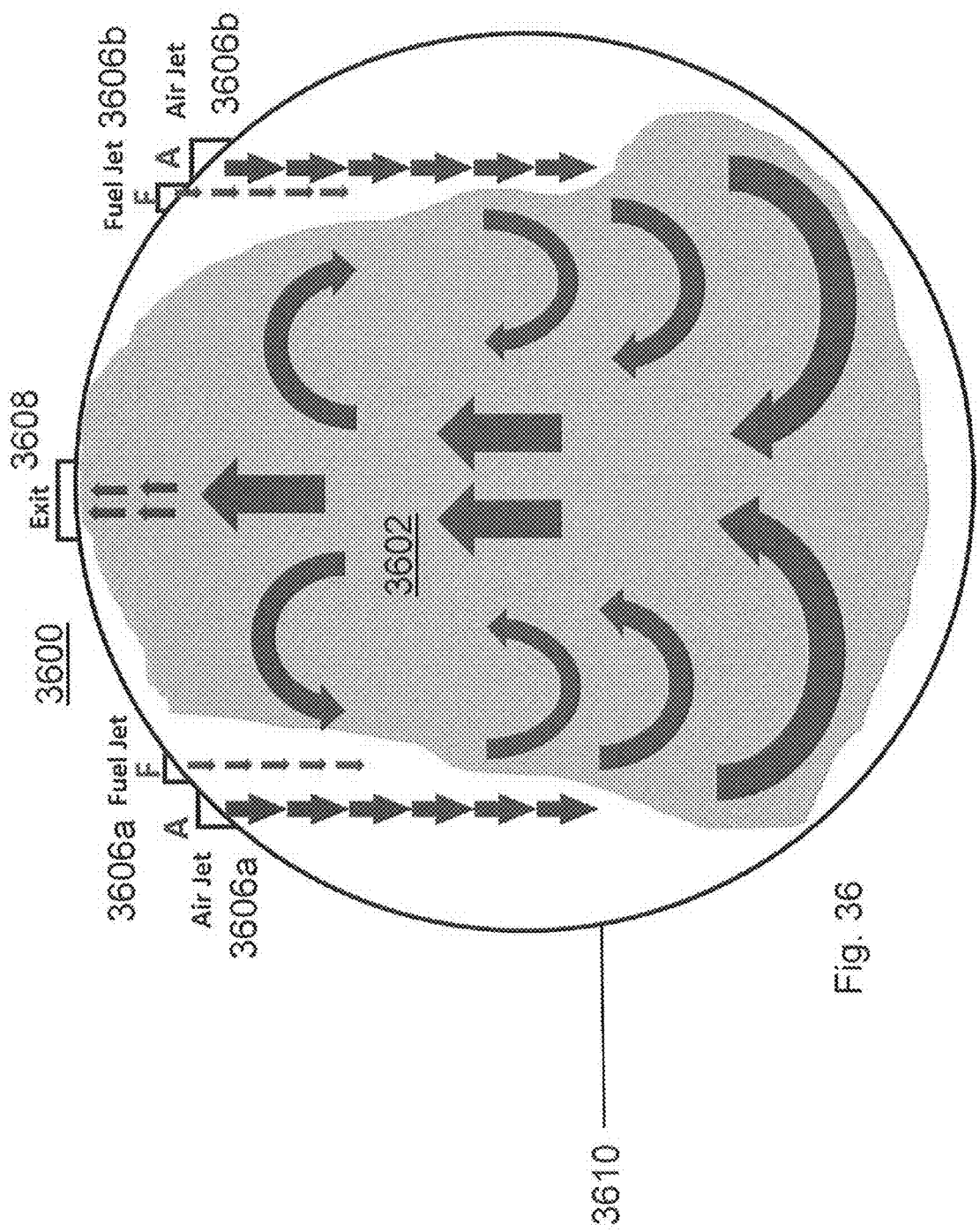

FIG. 36 illustrates a cylindrical gas turbine CDC combustor 3600 having a cylindrical combustion chamber 3602, two fuel injection ports 3604*a-b*, two air injection ports 3606*a-b*, and an exit port 3608 in fluid communication with the combustion chamber. All the ports are located on an outer circular surface 3610 of the combustor 3600.

As shown by FIG. 36, the heated air and fuel are injected tangentially with respect to the outer circular surface 3610 of the cylindrical combustion chamber 3602. The fuel is injected immediately behind the air injection. A vertical uniform thermal field is created within the combustion chamber 3602. The combustion byproducts exit the combustion chamber 3602 via the exit port 3608. Ignition occurs in proximity to the fuel and air injection ports and colorless distributed combustion occurs mainly throughout the combustion chamber 3602.

Figure 37:
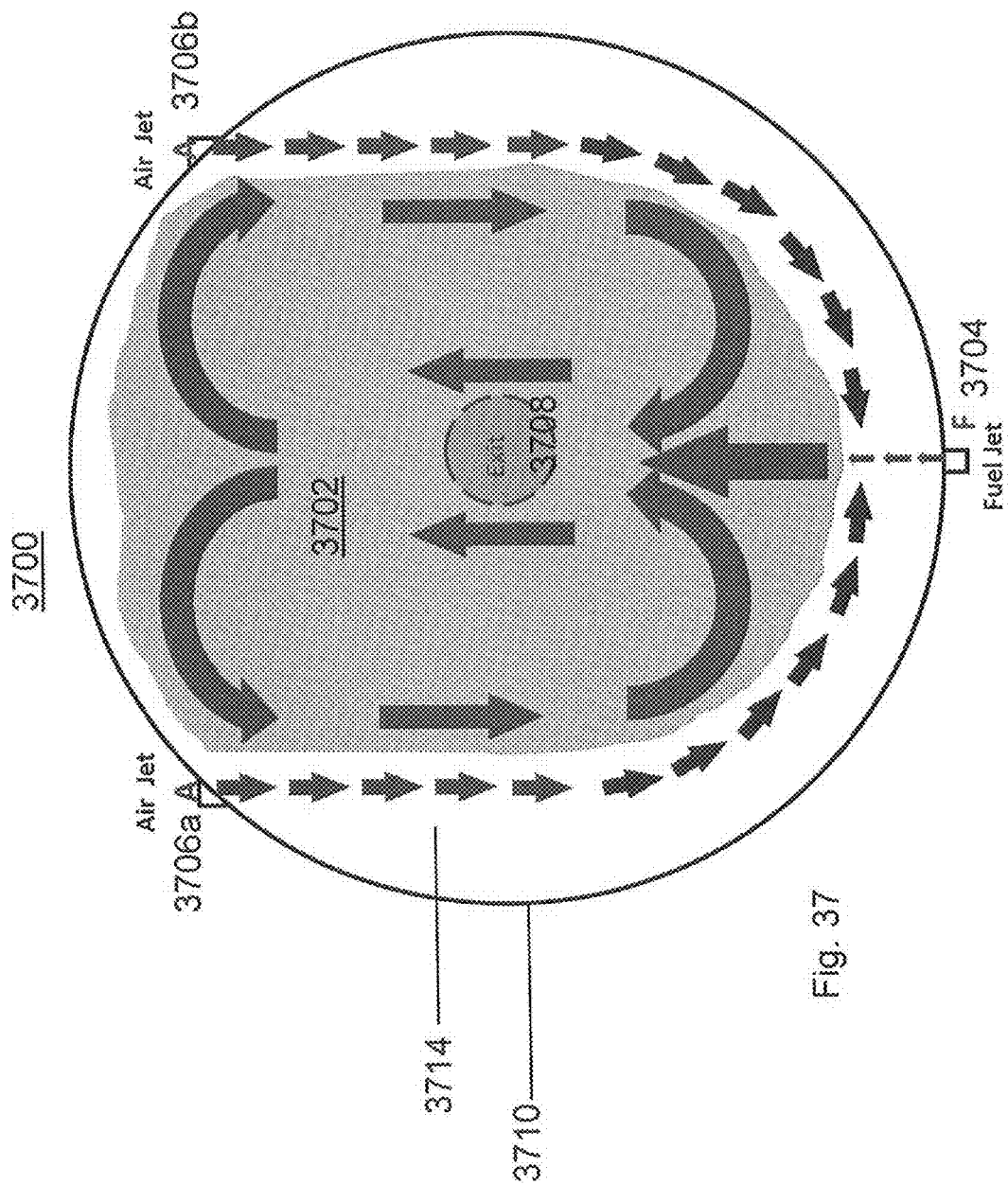

FIG. 37 illustrates a cylindrical gas turbine CDC combustor 3700 having a cylindrical combustion chamber 3702, a fuel injection port 3704 in fluid communication with the combustion chamber, two air injection ports 3706a-b, and an exit port 3708 in fluid communication with the combustion chamber. The fuel and air injection ports are located on an outer circular surface 3710 of the combustor 3700, and the exit port 3708 is located along the longitudinal, central axis of the combustor 3700 on a top lateral side 3714 thereof.

As shown by FIG. 37, the heated air is injected tangentially with respect to the outer circular surface 3710 of the cylindrical combustion chamber 3702. The fuel is injected radially within the combustion chamber 3702 at a high velocity (e.g., 10 m/s to 100 m/s). A vertical uniform thermal field is created within the combustion chamber 3702. The combustion byproducts exit the combustion chamber 3702 via the exit port 3708. Ignition occurs in proximity to the fuel and air injection ports and colorless distributed combustion occurs mainly throughout the combustion chamber 3702.

Figure 38:
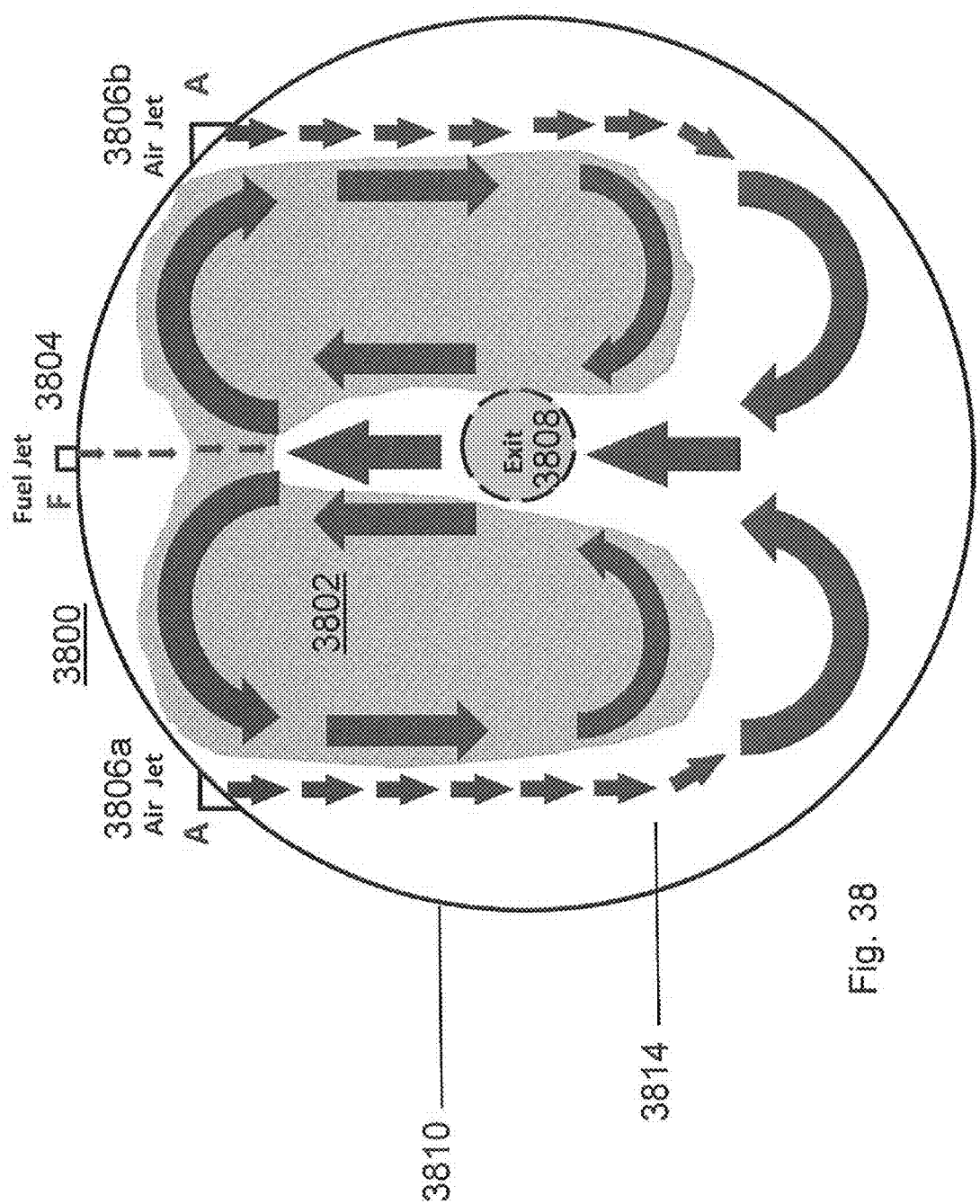

FIG. 38 illustrates a cylindrical gas turbine CDC combustor 3800 having a cylindrical combustion chamber 3802, a fuel injection port 3804 in fluid communication with the combustion chamber, two air injection ports 3806a-b, and an exit port 3808 in fluid communication with the combustion chamber. The fuel and air injection ports are located on an outer circular surface 3810 of the combustor 3800, and the exit port 3808 is located along the longitudinal, central axis of the combustor 3800 on a top lateral side 3814 thereof.

As shown by FIG. 38, the heated air is injected tangentially with respect to the outer circular surface 3810 of the cylindrical combustion chamber 3802. The fuel is injected radially within the combustion chamber 3802 at a high velocity (e.g., 10 m/s to 100 m/s). Two vertical uniform thermal fields are created within the combustion chamber 3802 on either side of the longitudinal axis of the combustor 3800. The combustion byproducts exit the combustion chamber 3802 via the exit port 3808. Ignition occurs in proximity to the fuel injection port 3804.

Figure 39:
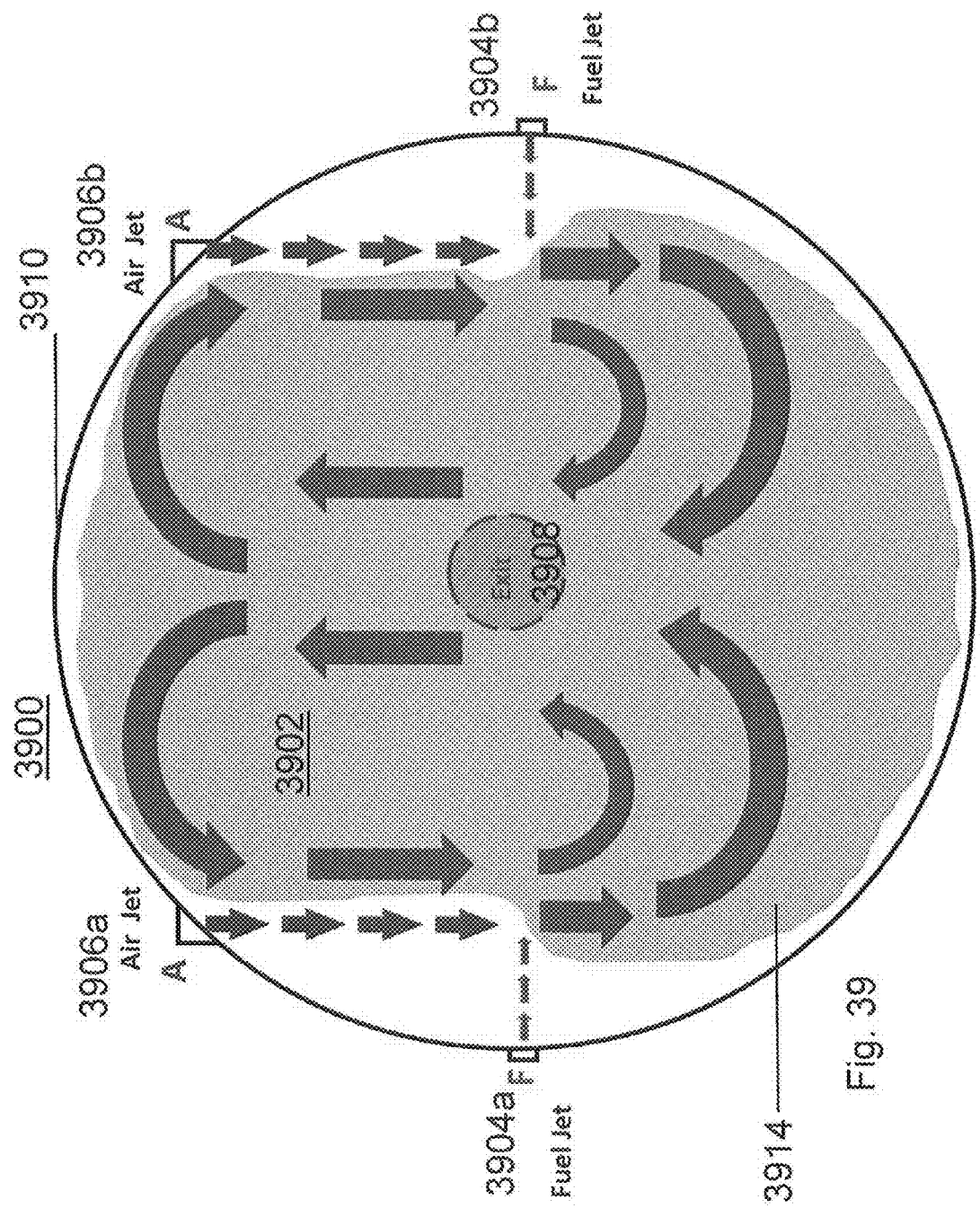

FIG. 39 illustrates a cylindrical gas turbine CDC combustor 3900 having a cylindrical combustion chamber 3902, two fuel injection ports 3904a-b, two air injection ports 3906a-b, and an exit port 3908 in fluid communication with the combustion chamber. The fuel and air injection ports are located on an outer circular surface 3910 of the combustor 3900, and the exit port 3908 is located along the longitudinal, central axis of the combustor 3900 on a top lateral side 3914 thereof.

As shown by FIG. 39, the heated air is injected tangentially with respect to the outer circular surface 3910 of the cylindrical combustion chamber 3902. The fuel is injected radially within the combustion chamber 3902 after dilution of the heated air. The heated air is diluted by mixing of the air jets from air injection ports 3906a-b with the combustion products within the combustion chamber 3902 to provide diluted low oxygen concentration air at an elevated temperature. A vertical uniform thermal field is created within the combustion chamber 3902. The combustion byproducts exit the combustion chamber 3902 via the exit port 3908. Ignition occurs in proximity to the fuel injection port 3904 and colorless distributed combustion occurs mainly throughout the combustion chamber 3902.

Figure 40:
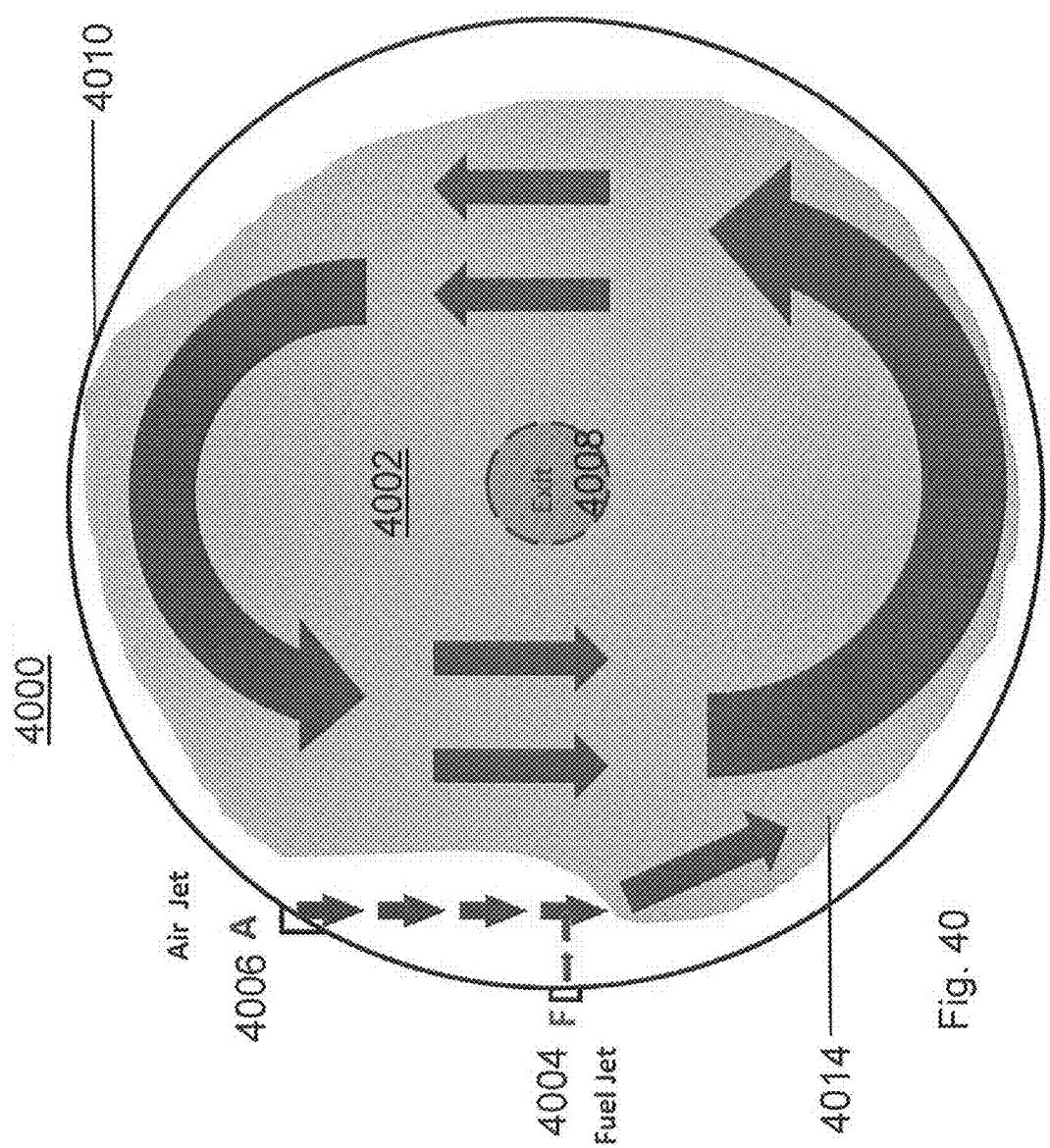

FIG. 40 illustrates a cylindrical gas turbine CDC combustor 4000 having a cylindrical combustion chamber 4002, a fuel injection port 4004 in fluid communication with the combustion chamber, an air injection port 4006 in fluid communication with the combustion chamber, and an exit port 4008 in fluid communication with the combustion chamber. The fuel and air injection ports are located on an outer circular surface 4010 of the combustor 4000, and the exit port 4008 is located along the longitudinal, central axis of the combustor 4000 on a top lateral side 4014 thereof.

As shown by FIG. 40, the heated air is injected inwardly and the fuel is injected radially within the combustion chamber 4002. A vertical uniform thermal field is created within the combustion chamber 4002. The combustion byproducts exit the combustion chamber 4002 via the exit port 4008. Ignition occurs in proximity to the fuel injection port 4004 and colorless distributed combustion occurs mainly throughout the combustion chamber 4002.

Figure 41:
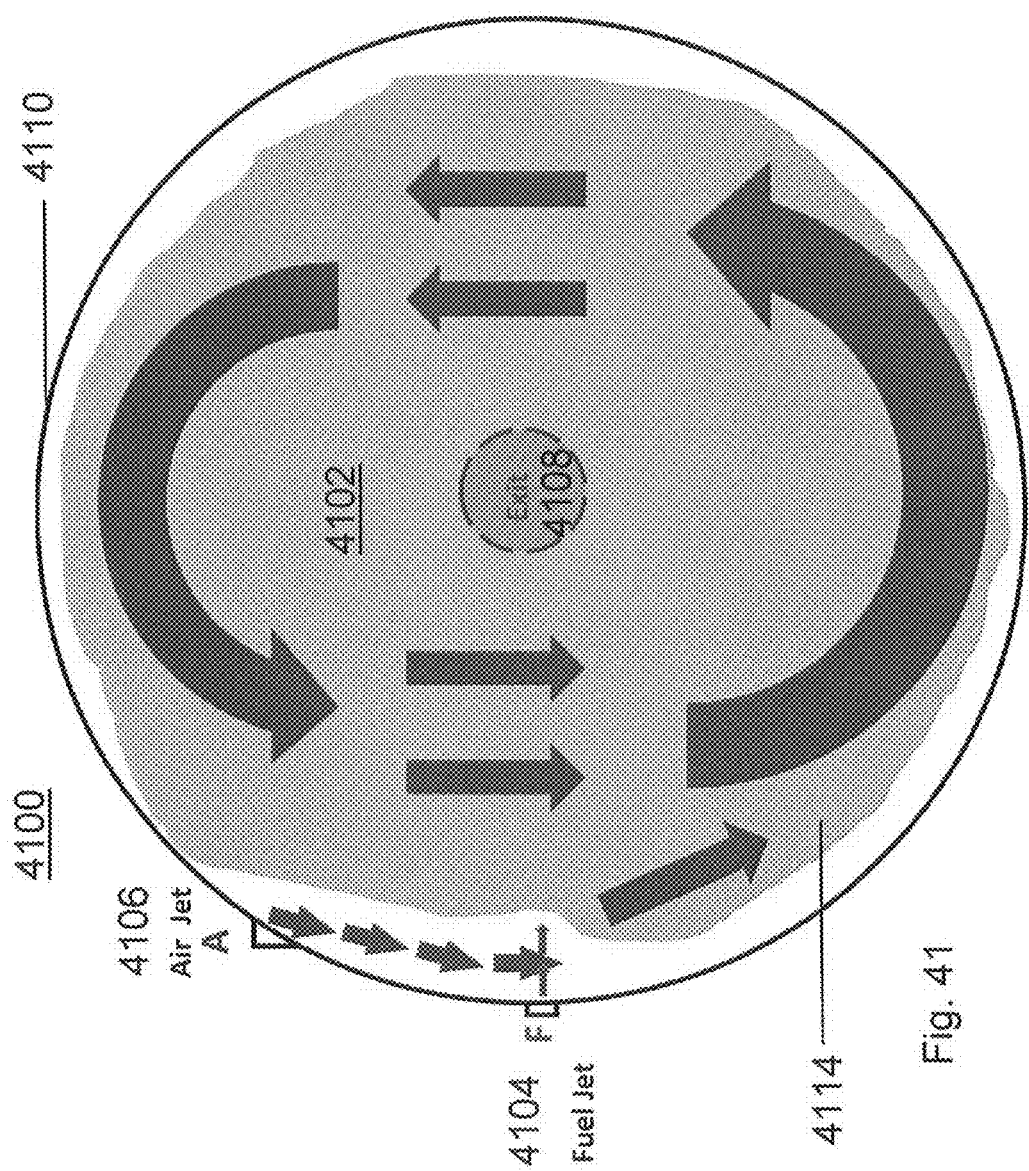

FIG. 41 illustrates a cylindrical gas turbine CDC combustor 4100 having a cylindrical combustion chamber 4102, a fuel injection port 4104 in fluid communication with the combustion chamber, an air injection port 4106 in fluid communication with the combustion chamber, and an exit port 4108 in fluid communication with the combustion chamber. The fuel and air injection ports are located on an outer circular surface 4110 of the combustor 4100, and the exit port 4108 is located along the longitudinal, central axis of the combustor 4100 on a top lateral side 4114 thereof.

As shown by FIG. 41, the heated air is injected tangentially with respect to the outer circular surface 4110 of the cylindrical combustion chamber 4102. The fuel is injected radially within the combustion chamber 4102. A vertical uniform thermal field is created within the combustion chamber 4102. The combustion byproducts exit the combustion chamber 4102 via the exit port 4108. Ignition occurs in proximity to the fuel injection port 4104 and colorless distributed combustion occurs mainly throughout the combustion chamber 4102.

Figure 42:
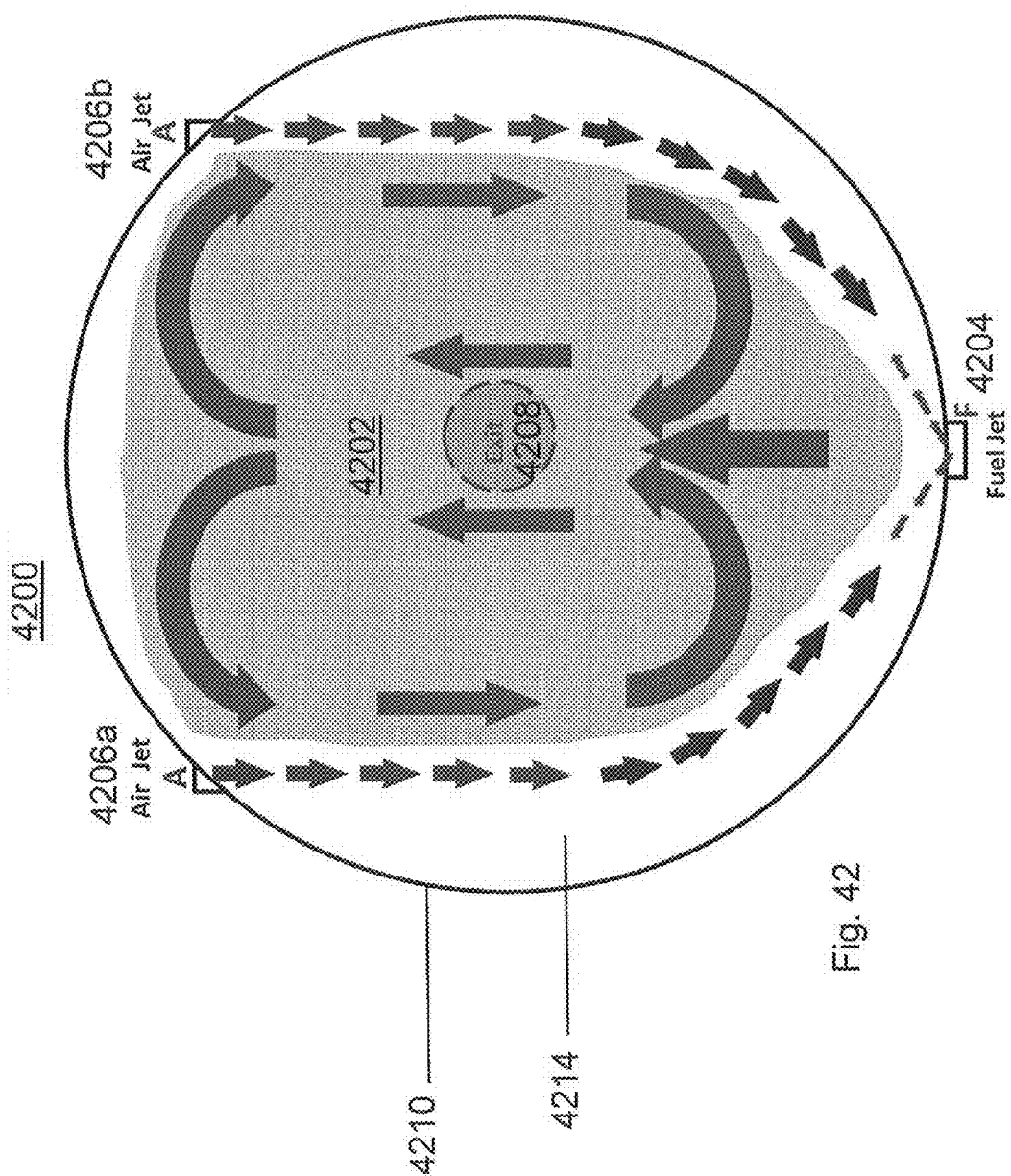

FIG. 42 illustrates a cylindrical gas turbine CDC combustor 4200 having a cylindrical combustion chamber 4202, a fuel injection port 4204 in fluid communication with the combustion chamber, two air injection ports 4206a-b, and an exit port 4208 in fluid communication with the combustion chamber. The fuel and air injection ports are located on an outer circular surface 4210 of the combustor 4200, and the exit port 4208 is located along the longitudinal, central axis of the combustor 4200 on a top lateral side 4214 thereof.

As shown by FIG. 42, the heated air is injected tangentially with respect to the outer circular surface 4210 of the cylindrical combustion chamber 4202. The fuel is injected radially within the combustion chamber 4202 at a low velocity (e.g., less than 10 m/s). A vertical uniform thermal field is created within the combustion chamber 4202. The combustion byproducts exit the combustion chamber 4202 via the exit port 4208. Ignition occurs in proximity to the fuel injection port and colorless distributed combustion occurs mainly throughout the combustion chamber 4202, except for two regions in proximity to each air injection port 4206.

Figure 43:
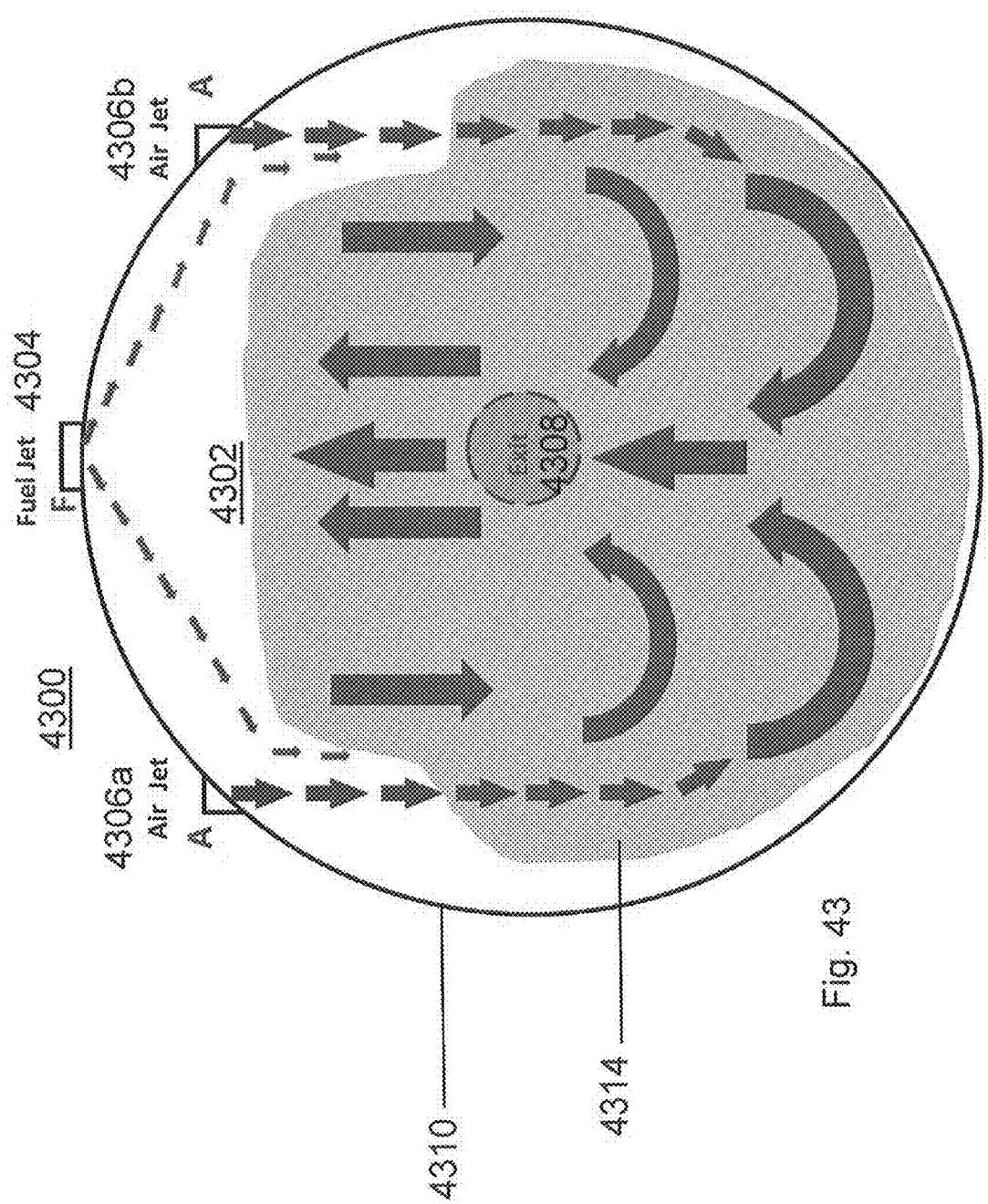

FIG. 43 illustrates a cylindrical gas turbine CDC combustor 4300 having a cylindrical combustion chamber 4302, a fuel injection port 4304 in fluid communication with the combustion chamber, two air injection ports 4306a-b, and an exit port 4308 in fluid communication with the combustion chamber. The fuel and air injection ports are located on an outer circular surface 4310 of the combustor 4300, and the exit port 4308 is located along the longitudinal, central axis of the combustor 4300 on a top lateral side 4314 thereof.

As shown by FIG. 43, the heated air is injected tangentially with respect to the outer circular surface 4310 of the cylindrical combustion chamber 4302. The fuel is injected radially within the combustion chamber 4302 at a low velocity (e.g., less than 10 m/s). A vertical uniform thermal field is created within the combustion chamber 4302. The combustion byproducts exit the combustion chamber 4302 via the exit port 4308. Ignition occurs in proximity to the fuel injection port and colorless distributed combustion occurs mainly throughout the combustion chamber 4302, except for a region near the fuel injection port 4304.

Figure 44:
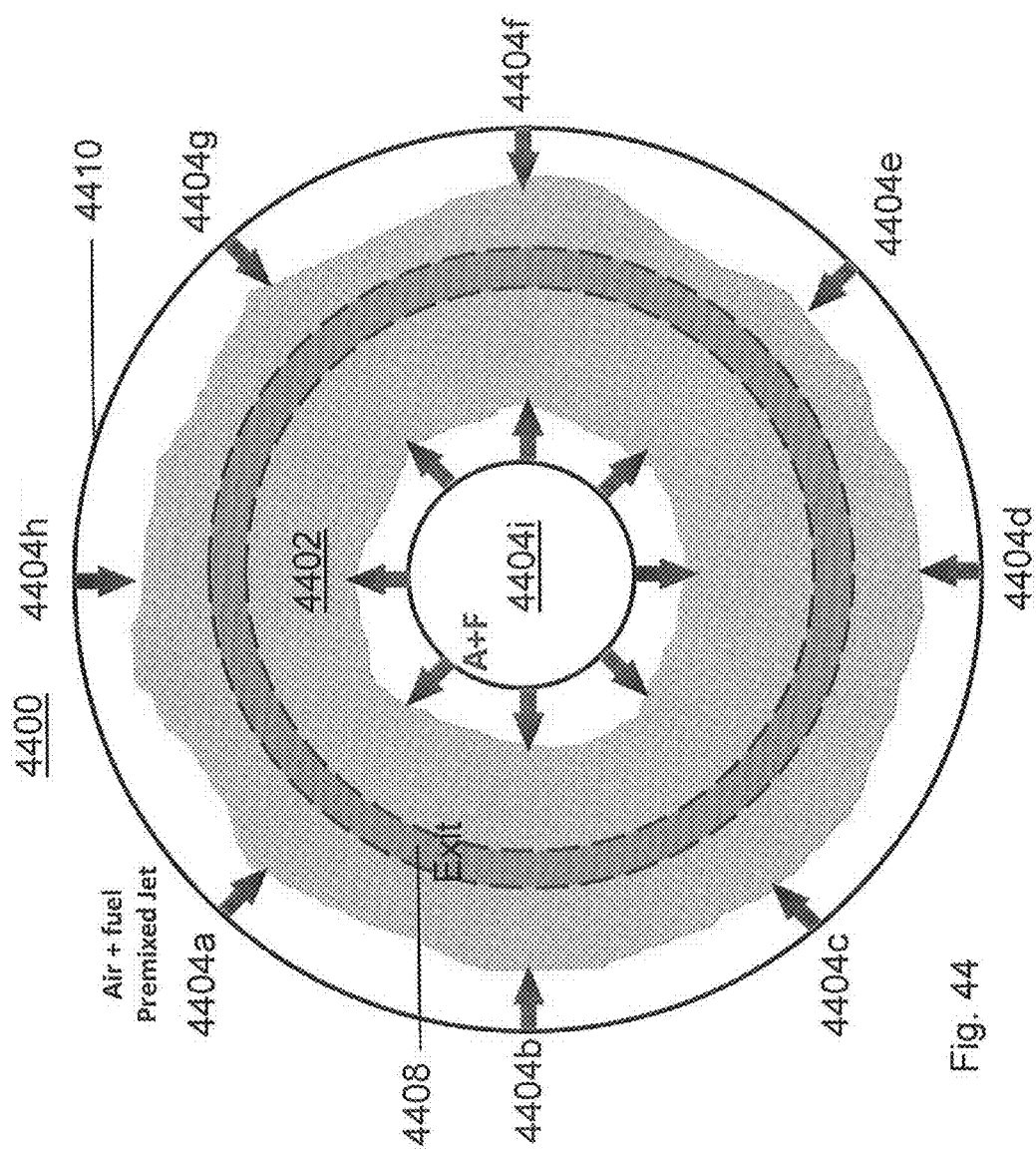

FIG. 44 illustrates a cylindrical gas turbine CDC combustor 4400 having a cylindrical combustion chamber 4402, a plurality of fuel/air injection ports 4404*a-h*, including one large fuel/air injection port 4404*i*, and an exit port 4408 in fluid communication with the combustion chamber. The fuel/air injection ports 4404*a-h* are located on an outer circular surface 4410 of the combustor 4400; the large fuel/air injection port 4404*i* is located along a longitudinal, central axis of the combustor 4400. The exit port 4408 is donut-shaped and located annularly with respect to the longitudinal, central axis of the combustor 4400.

As shown by FIG. 44, the premixed fuel and heated air is injected radially from the fuel/air injection ports 4404*a-i*. A uniform thermal field is created within the combustion chamber 4402. The combustion byproducts exit the combustion chamber 4402 via the exit port 4408. Ignition occurs in proximity to the fuel/air injection ports 4404*a-i* and colorless distributed combustion occurs mainly throughout the combustion chamber 4402, except for a circumferential region in proximity to the outer circular surface 4410.

Figure 45:
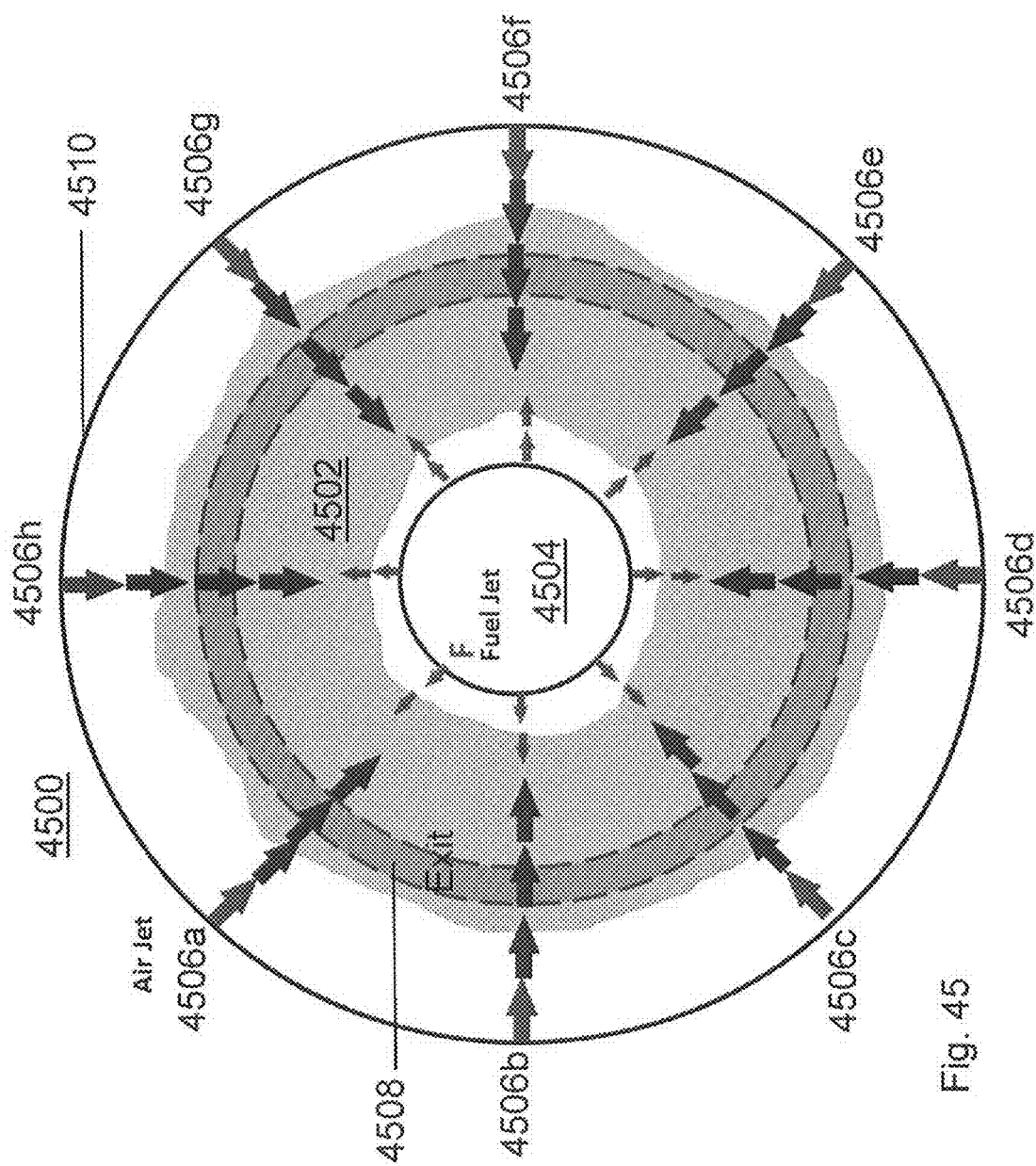

FIG. 45 illustrates a cylindrical gas turbine CDC combustor 4500 having a cylindrical combustion chamber 4502, a plurality of air injection ports 4506*a-h*, a large fuel injection port 4504 in fluid communication with the combustion chamber, and an exit port 4508 in fluid communication with the combustion chamber. The air injection ports 4506*a-h* are located on an outer circular surface 4510 of the combustor 4500; the large fuel injection port 4504 is located along a longitudinal, central axis of the combustor 4500. The exit port 4508 is donut-shaped and located annularly with respect to the longitudinal, central axis of the combustor 4500.

As shown by FIG. 45, the heated air is injected radially from the air injection ports 4504*a-h*. A uniform thermal field is created within the combustion chamber 4502. The combustion byproducts exit the combustion chamber 4502 via the exit port 4508. Ignition occurs in proximity to the fuel injection ports 4504 and colorless distributed combustion occurs mainly throughout the combustion chamber 4502, except for a circumferential region in proximity to the outer circular surface 4510.

The described embodiments of the present disclosure are intended to be illustrative rather than restrictive, and are not intended to represent every embodiment of the present disclosure. Various modifications and variations can be made without departing from the spirit or scope of the disclosure as set forth in the following claims both literally and in equivalents recognized in law.

What is claimed is:

1. A gas turbine combustor comprising:
  a housing defining an arcuate surface portion and a combustion chamber, the combustion chamber defining a longitudinal central axis;
  at least one first fluid injection port extending tangentially through the arcuate surface portion of the housing and in fluid communication with the combustion chamber;
  at least one second fluid injection port extending radially through the arcuate surface portion of the housing and in fluid communication with the combustion chamber; and
  an exit port located on the housing along the longitudinal axis of the combustion chamber and in fluid communication with the combustion chamber;
  wherein the at least one first fluid injection port, the at least one second fluid injection port, and the exit port are located such that during operation a heated oxidizer fluid is introduced into the combustion chamber via the at least one first fluid injection port and fuel is introduced into the combustion chamber via the at least one second fluid injection port to cause ignition and colorless distributed combustion to occur within the combustion chamber creating a single uniform thermal field within the housing, and
  wherein combustion byproducts exit the combustion chamber via the exit port.

2. The gas turbine combustor according to claim 1,
  wherein the housing defines a first arcuate surface portion and a second arcuate surface portion defining at least one intersection point therebetween,
  wherein the at least one first fluid injection port is located on the first arcuate surface portion; and
  wherein the at least one second fluid injection port is located at the at least one intersection point.

3. The gas turbine combustor according to claim 1,
  wherein the housing is selected from the group consisting of circular, stadium and elliptical shaped housings.

4. A gas turbine combustor comprising:
  a housing defining an arcuate surface portion and a combustion chamber, the combustion chamber defining a longitudinal central axis;
  at least one first fluid injection port extending tangentially through the arcuate surface portion of the housing and in fluid communication with the combustion chamber;
  at least one second fluid injection port extending radially through the arcuate surface portion of the housing and in fluid communication with the combustion chamber; and
  an exit port disposed to extend through the housing along the longitudinal axis of the combustion chamber and in fluid communication with the combustion chamber;
  wherein the at least one first fluid injection port, the at least one second fluid injection port, and the exit port are located such that during operation a heated oxidizer fluid is introduced into the combustion chamber via the at least one first fluid injection port and fuel is introduced into the combustion chamber via the at least one second fluid injection port to cause ignition and colorless distributed combustion to occur within the combustion chamber creating a single uniform thermal field within the housing, and
  wherein combustion byproducts exit the combustion chamber via the exit port.

5. The gas turbine combustor according to claim 4,
  wherein the housing defines a first arcuate surface portion and a second arcuate surface portion defining at least one intersection point therebetween,
  wherein the at least one first fluid injection port is located on the first arcuate surface portion; and
  wherein the at least one second fluid injection port is located at the at least one intersection point.

6. The gas turbine combustor according to claim 4, wherein the housing is selected from the group consisting of circular, stadium and elliptical shaped housings.

* * * * *